US010849124B2

(12) United States Patent
Hosseini et al.

(10) Patent No.: US 10,849,124 B2
(45) Date of Patent: Nov. 24, 2020

(54) GRANT-FREE DOWNLINK TRANSMISSION

(71) Applicant: QUALCOMM Incorporated, San Diego, CA (US)

(72) Inventors: Seyedkianoush Hosseini, San Diego, CA (US); Wanshi Chen, San Diego, CA (US); Shimman Arvind Patel, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/223,834

(22) Filed: Dec. 18, 2018

(65) Prior Publication Data

US 2019/0200352 A1 Jun. 27, 2019

Related U.S. Application Data

(60) Provisional application No. 62/609,266, filed on Dec. 21, 2017.

(51) Int. Cl.
*H04W 72/04* (2009.01)
*H04L 1/18* (2006.01)

(52) U.S. Cl.
CPC ....... *H04W 72/0446* (2013.01); *H04L 1/1812* (2013.01); *H04W 72/042* (2013.01)

(58) Field of Classification Search
CPC ....... H04L 1/08; H04L 1/1812; H04L 1/1822; H04L 47/27; H04W 72/04; H04W 72/042;

(Continued)

(56) References Cited

U.S. PATENT DOCUMENTS 8,897,202 B2\* 11/2014 Chen ............... H04B 7/155
370/310
2017/0273058 A1\* 9/2017 Agiwal ............ H04W 16/28
(Continued)

FOREIGN PATENT DOCUMENTS

WO WO-2017034096 A1 3/2017

OTHER PUBLICATIONS

International Search Report and Written Opinion—PCT/US2018/066456—ISA/EPO—dated Feb. 28, 2019.

*Primary Examiner* — Kan Yuen
(74) *Attorney, Agent, or Firm* — Holland & Hart LLP

(57) ABSTRACT

Methods, systems, and devices for wireless communications are described. The described techniques generally support downlink transmissions. For example, a user equipment (UE) may receive a resource configuration for reception of a downlink transmission within a repetition window, the resource configuration including an indicator of a repetition window size for the downlink transmission. The UE may monitor, according to the resource configuration, one or more transmission time intervals (TTIs) of the repetition window for reception of the downlink transmission. In some cases, the downlink transmission may be a grant-free downlink transmission. Here, the UE may attempt to decode the grant-free downlink transmission during the one or more TTIs based at least in part on the repetition window size. Using the described techniques, the UE may efficiently determine one or more decoding parameters for the grant-free downlink transmission, thereby providing benefits in terms of latency reduction, power consumption, etc.

31 Claims, 24 Drawing Sheets

(58) Field of Classification Search
CPC .......... H04W 72/0446; H04W 72/048; H04W 72/1289; H04W 74/00; H04W 74/002; H04W 74/006
See application file for complete search history.

(56) References Cited

U.S. PATENT DOCUMENTS

| | | |
|---|---|---|
| 2017/0310431 A1 | 10/2017 | Iyer et al. |
| 2018/0242280 A1* | 8/2018 | Axmon ............... H04L 41/0823 |
| 2018/0368024 A1* | 12/2018 | Cheng ...................... H04L 5/14 |
| 2020/0021388 A1* | 1/2020 | Lyu ..................... H04W 72/044 |

* cited by examiner

GRANT-FREE DOWNLINK TRANSMISSION

CROSS REFERENCES

The present Application for Patent claims the benefit of U.S. Provisional Patent Application No. 62/609,266 by HOSSEINI et al., entitled "GRANT-FREE DOWNLINK TRANSMISSION," filed Dec. 21, 2017, assigned to the assignee hereof, and expressly incorporated by reference herein.

BACKGROUND

The following relates generally to wireless communication, and more specifically to grant-free downlink transmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-s-OFDM). A wireless multiple-access communications system may include a number of base stations or network access nodes, each simultaneously supporting communication for multiple communication devices, which may be otherwise known as user equipment (UE).

Some wireless communications may require or benefit from low latency access. For example, ultra-reliable low latency communications (URLLC) may achieve such low latency through the use of small packet sizes, short transmission intervals, or the like. In some wireless systems, downlink transmissions (from a base station to a UE) may be scheduled, which scheduling may consume wireless resources and introduce overhead for the system. This overhead may, in turn, increase latency and may therefore be undesirable in some cases (e.g., for URLLC). Improved techniques for downlink transmissions that support low latency communications may thus be desired.

SUMMARY

The described techniques relate to improved methods, systems, devices, or apparatuses that support grant-free downlink transmission. Generally, the described techniques provide for one or more frameworks for grant-free downlink transmissions, which frameworks may be leveraged by a user equipment (UE) to decode the grant-free downlink transmissions. Specifically, the UE may be configured (e.g., via radio resource control (RRC) signaling) with parameters (e.g., time/frequency resources, a transport block size (TBS), a redundancy version (RV) sequence, a repetition window size, etc.) for the grant-free downlink transmission. Based on applying the configured parameters within the one or more frameworks discussed below, the UE may efficiently decode a grant-free downlink transmission. For example, the reduced number of blind decoding attempts supported by aspects of the following (e.g., as compared to an unconstrained search across candidate RV indices and/or hybrid automatic repeat request (HARQ) process identifications (IDs)) may provide for low latency communications (e.g., by allowing a downlink transmission to be decoded within a threshold amount of time corresponding to the low latency process).

A method of wireless communication at a UE is described. The method may include receiving a resource configuration for reception of a downlink transmission within a repetition window, the resource configuration including an indicator of a repetition window size for the downlink transmission, monitoring, in accordance with the resource configuration, one or more transmission time intervals (TTIs) of the repetition window for reception of the downlink transmission, and attempting to decode the downlink transmission during the one or more TTIs of the repetition window based on the repetition window size.

An apparatus for wireless communication at a UE is described. The apparatus may include a processor, memory in electronic communication with the processor, and instructions stored in the memory. The instructions may be executable by the processor to cause the apparatus to receive a resource configuration for reception of a downlink transmission within a repetition window, the resource configuration including an indicator of a repetition window size for the downlink transmission, monitor, in accordance with the resource configuration, one or more transmission time intervals (TTIs) of the repetition window for reception of the downlink transmission, and attempt to decode the downlink transmission during the one or more TTIs of the repetition window based on the repetition window size.

Another apparatus for wireless communication at a UE is described. The apparatus may include means for receiving a resource configuration for reception of a downlink transmission within a repetition window, the resource configuration including an indicator of a repetition window size for the downlink transmission, monitoring, in accordance with the resource configuration, one or more transmission time intervals (TTIs) of the repetition window for reception of the downlink transmission, and attempting to decode the downlink transmission during the one or more TTIs of the repetition window based on the repetition window size.

A non-transitory computer-readable medium storing code for wireless communication at a UE is described. The code may include instructions executable by a processor to receive a resource configuration for reception of a downlink transmission within a repetition window, the resource configuration including an indicator of a repetition window size for the downlink transmission, monitor, in accordance with the resource configuration, one or more transmission time intervals (TTIs) of the repetition window for reception of the downlink transmission, and attempt to decode the downlink transmission during the one or more TTIs of the repetition window based on the repetition window size.

In some examples of the method, apparatuses, and non-transitory computer-readable medium described herein, monitoring the one or more TTIs of the repetition window for reception of the downlink transmission may include operations, features, means, or instructions for monitoring for a first repetition of the downlink transmission in an initial TTI of the repetition window, where the repetition window size may be greater than one TTI.

In some examples of the method, apparatuses, and non-transitory computer-readable medium described herein, attempting to decode the downlink transmission may include operations, features, means, or instructions for identifying a series of redundancy version (RV) indices for the repetition window based on the resource configuration, each RV index of the series of RV indices associated with a respective TTI of the repetition window, and attempting to decode the downlink transmission during a given TTI of the repetition window based on the RV index associated with the given TTI.

In some examples of the method, apparatuses, and non-transitory computer-readable medium described herein, the resource configuration may be received via RRC signaling, the resource configuration further including a series of redundancy version (RV) indices for repeated transmissions of the downlink transmission within the repetition window.

In some examples of the method, apparatuses, and non-transitory computer-readable medium described herein, attempting to decode the downlink transmission may include operations, features, means, or instructions for transmitting an indication that the downlink transmission was successfully decoded.

In some examples of the method, apparatuses, and non-transitory computer-readable medium described herein, the downlink transmission may be a grant-free downlink transmission.

In some examples of the method, apparatuses, and non-transitory computer-readable medium described herein, attempting to decode the grant-free downlink transmission may include operations, features, means, or instructions for identifying a potential redundancy version (RV) index and a corresponding HARQ process identification (ID) for the grant-free downlink transmission, where each decoding attempt may be based on a unique pair of potential RV index and corresponding HARQ process ID.

In some examples of the method, apparatuses, and non-transitory computer-readable medium described herein, identifying the potential RV index and the corresponding HARQ process ID for the grant-free downlink transmission may include operations, features, means, or instructions for determining a TTI index for each of the one or more TTIs of the repetition window, where the corresponding HARQ process ID for a given TTI may be based on the TTI index for the given TTI.

In some examples of the method, apparatuses, and non-transitory computer-readable medium described herein, monitoring the one or more TTIs of the repetition window for reception of the grant-free downlink transmission may include operations, features, means, or instructions for identifying, based on the resource configuration, a subset of TTIs within the repetition window during which a first repetition of the grant-free downlink transmission may be allowed to be transmitted, where the repetition window includes the subset of TTIs and at least one other ill, and monitoring for a first repetition of the grant-free downlink transmission during at least one TTI of the subset of TTIs.

In some examples of the method, apparatuses, and non-transitory computer-readable medium described herein, a redundancy version (RV) index of the first repetition of the grant-free downlink transmission may be zero (0).

In some examples of the method, apparatuses, and non-transitory computer-readable medium described herein, attempting to decode the grant-free downlink transmission may include operations, features, means, or instructions for identifying a series of redundancy version (RV) indices for the repetition window based on the resource configuration, determining one or more potential RV indices for each TTI of the repetition window, where each potential RV index for each TTI may be based on the series of RV indices beginning at a respective TTI of the subset of TTIs, and attempting to decode the grant-free downlink transmission during a given TTI of the repetition window based on the one or more potential RV indices for the given TTI.

In some examples of the method, apparatuses, and non-transitory computer-readable medium described herein, attempting to decode the grant-free downlink transmission may include operations, features, means, or instructions for identifying a series of redundancy version (RV) indices for the repetition window based on the resource configuration, identifying a HARQ process identification (ID) for each TTI of the repetition window, where the HARQ process ID for each TTI may be based on the series of RV indices beginning at a respective TTI of the subset of TTIs, and combining logarithmic likelihood ratios (LLRs) of the grant-free downlink transmission for a given TTI with a previously received signal based on the HARQ process ID.

Some examples of the method, apparatuses, and non-transitory computer-readable medium described herein may further include operations, features, means, or instructions for failing to decode the first repetition of the grant-free downlink transmission during an initial TTI of the subset of TTIs, and attempting to decode the first repetition of the grant-free downlink transmission during an immediately subsequent TTI of the subset of TTIs based on failing to decode the first repetition during the initial TTI of the subset of TTIs.

In some examples of the method, apparatuses, and non-transitory computer-readable medium described herein, monitoring the one or more TTIs of the repetition window for reception of the grant-free downlink transmission may include operations, features, means, or instructions for monitoring for a first repetition of the grant-free downlink transmission during any TTI of the repetition window, where the repetition window includes a set of TTIs.

In some examples of the method, apparatuses, and non-transitory computer-readable medium described herein, attempting to decode the grant-free downlink transmission may include operations, features, means, or instructions for identifying a series of redundancy version (RV) indices for the repetition window based on the resource configuration, determining one or more potential RV indices for each TTI of the repetition window, where each potential RV index for each TTI may be based on the series of RV indices beginning at any TTI of the repetition window, and attempting to decode the grant-free downlink transmission during a given TTI of the repetition window based on the one or more potential RV indices for the given TTI.

In some examples of the method, apparatuses, and non-transitory computer-readable medium described herein, attempting to decode the grant-free downlink transmission may include operations, features, means, or instructions for identifying a series of redundancy version (RV) indices for the repetition window based on the resource configuration, identifying a HARQ process identification (ID) for each TTI of the repetition window, where the HARQ process ID for each TTI may be based on the series of RV indices beginning at any TTI of the repetition window, and combining logarithmic likelihood ratios (LLRs) of the grant-free downlink transmission for a given TTI with a previously received signal based on the HARQ process ID.

Some examples of the method, apparatuses, and non-transitory computer-readable medium described herein may further include operations, features, means, or instructions for determining that a first decoding hypothesis corresponding to decoding the first repetition of the grant-free downlink transmission during a given TTI of the repetition window may have failed, and attempting to decode a second repetition of the grant-free downlink transmission using a second decoding hypothesis during the given TTI of the repetition window based on the determination that the first decoding hypothesis may have failed.

Some examples of the method, apparatuses, and non-transitory computer-readable medium described herein may further include operations, features, means, or instructions for attempting to decode the first repetition of the grant-free downlink transmission using an additional decoding hypothesis during a subsequent TTI of the repetition window based on the determination that the first decoding hypothesis may have failed.

Some examples of the method, apparatuses, and non-transitory computer-readable medium described herein may further include operations, features, means, or instructions for transmitting an indication of a capability of the UE, the capability indicating a maximum repetition window size supported by the UE, a timing within the repetition window for which the UE supports transmission of a first repetition of the grant-free downlink transmission, or combinations of the same.

A method of wireless communication at a base station is described. The method may include transmitting, to a UE, a resource configuration for transmission of a downlink transmission within a repetition window, the resource configuration including an indicator of a repetition window size for the downlink transmission and transmitting the downlink transmission to the UE in accordance with the resource configuration.

An apparatus for wireless communication at a base station is described. The apparatus may include a processor, memory in electronic communication with the processor, and instructions stored in the memory. The instructions may be executable by the processor to cause the apparatus to transmit, to a UE, a resource configuration for transmission of a downlink transmission within a repetition window, the resource configuration including an indicator of a repetition window size for the downlink transmission and transmit the downlink transmission to the UE in accordance with the resource configuration.

Another apparatus for wireless communication at a base station is described. The apparatus may include means for transmitting, to a UE, a resource configuration for transmission of a downlink transmission within a repetition window, the resource configuration including an indicator of a repetition window size for the downlink transmission and transmitting the downlink transmission to the UE in accordance with the resource configuration.

A non-transitory computer-readable medium storing code for wireless communication at a base station is described. The code may include instructions executable by a processor to transmit, to a UE, a resource configuration for transmission of a downlink transmission within a repetition window, the resource configuration including an indicator of a repetition window size for the downlink transmission and transmit the downlink transmission to the UE in accordance with the resource configuration.

In some examples of the method, apparatuses, and non-transitory computer-readable medium described herein, transmitting the downlink transmission to the UE may include operations, features, means, or instructions for transmitting a first repetition of the downlink transmission during an initial TTI of the repetition window, the first repetition being associated with a first redundancy version (RV) index, and transmitting one or more additional repetitions of the downlink transmission during one or more corresponding subsequent TTIs of the repetition window, each of the one or more additional repetitions being associated with a respective RV index.

In some examples of the method, apparatuses, and non-transitory computer-readable medium described herein, the resource configuration may be transmitted via RRC signaling, the resource configuration further including a series of redundancy version (RV) indices for the repetition window.

Some examples of the method, apparatuses, and non-transitory computer-readable medium described herein may further include operations, features, means, or instructions for receiving, from the UE, an indication of a successful decoding of the downlink transmission.

In some examples of the method, apparatuses, and non-transitory computer-readable medium described herein, the downlink transmission may be a grant-free downlink transmission.

In some examples of the method, apparatuses, and non-transitory computer-readable medium described herein, transmitting the grant-free downlink transmission to the UE may include operations, features, means, or instructions for identifying a subset of transmission time intervals (TTIs) within the repetition window during which a first repetition of the grant-free downlink transmission may be allowed to be transmitted, where the repetition window includes the subset of TTIs and at least one other TTI, transmitting the first repetition of the grant-free downlink transmission during a TTI of the subset of TTIs, the first repetition being associated with a first redundancy version (RV) index, and transmitting one or more additional repetitions of the grant-free downlink transmission during one or more corresponding subsequent TTIs of the at least one other TTI, each of the one or more additional repetitions being associated with a respective RV index.

In some examples of the method, apparatuses, and non-transitory computer-readable medium described herein, transmitting the grant-free downlink transmission to the UE may include operations, features, means, or instructions for transmitting a first repetition of the grant-free downlink transmission during any TTI of the repetition window, the first repetition being associated with a first redundancy version (RV) index, and transmitting one or more additional repetitions of the grant-free downlink transmission during one or more corresponding subsequent TTIs of the repetition window, each of the one or more additional repetitions being associated with a respective RV index.

Some examples of the method, apparatuses, and non-transitory computer-readable medium described herein may further include operations, features, means, or instructions for receiving, from the UE, an indication of a capability of the UE, where the capability indicates a maximum repetition window size supported by the UE, a timing within the repetition window for which the UE supports transmission of a first repetition of the grant-free downlink transmission, or combinations of the same.

A method of wireless communication at a UE is described. The method may include a processor, memorying in electronic communication with the processor, instructions stored in the memory and executable by the processor to cause the apparatus to, monitoring, in accordance with the resource configuration, one or more transmission time intervals (TTIs) of the repetition window for reception of the downlink transmission, and attempting to decode the downlink transmission during the one or more TTIs of the repetition window based on the repetition window size.

An apparatus for wireless communication at a UE is described. The apparatus may include a processor, memory in electronic communication with the processor, and instructions stored in the memory. The instructions may be executable by the process or to cause the apparatus to a process or, memory in electronic communication with the processor, instructions stored in the memory and executable by the processor to cause the apparatus to monitor, in accordance with the resource configuration, one or more transmission time intervals (TTIs) of the repetition window for reception of the downlink transmission, and attempt to decode the downlink transmission during the one or more TTIs of the repetition window based on the repetition window size.

Another apparatus for wireless communication at a UE is described. The apparatus may include means for a processor, memorying in electronic communication with the processor, instructionsing stored in the memory and executable by the processor to cause the apparatus to, monitoring, in accordance with the resource configuration, one or more transmission time intervals (TTIs) of the repetition window for reception of the downlink transmission, and attempting to decode the downlink transmission during the one or more TTIs of the repetition window based on the repetition window size.

A non-transitory computer-readable medium storing code for wireless communication at a UE is described. The code may include instructions executable by a processor to to a processor, memory in electronic communication with the processor, instructions stored in the memory and executable by the processor to cause the apparatus to, monitor, in accordance with the resource configuration, one or more transmission time intervals (TTIs) of the repetition window for reception of the downlink transmission, and attempt to decode the downlink transmission during the one or more TTIs of the repetition window based on the repetition window size.

Some examples of the method, apparatuses, and non-transitory computer-readable medium described herein may further include operations, features, means, or instructions for monitoring for a first repetition of the downlink transmission in an initial TTI of the repetition window, where the repetition window size may be greater than one TTI.

Some examples of the method, apparatuses, and non-transitory computer-readable medium described herein may further include operations, features, means, or instructions for identifying a series of redundancy version (RV) indices for the repetition window based on the resource configuration, each RV index of the series of RV indices associated with a respective TTI of the repetition window, and attempt to decode the downlink transmission during a given TTI of the repetition window based on the RV index associated with the given TTI.

In some examples of the method, apparatuses, and non-transitory computer-readable medium described herein, the downlink transmission may be a grant-free downlink transmission.

Some examples of the method, apparatuses, and non-transitory computer-readable medium described herein may further include operations, features, means, or instructions for identifying a potential redundancy version (RV) index and a corresponding HARQ process identification (ID) for the grant-free downlink transmission, where each decoding attempt may be based on a unique pair of potential RV index and corresponding HARQ process ID.

Some examples of the method, apparatuses, and non-transitory computer-readable medium described herein may further include operations, features, means, or instructions for determining a TTI index for each of the one or more TTIs of the repetition window, where the corresponding HARQ process ID for a given TTI may be based on the TTI index for the given TTI.

Some examples of the method, apparatuses, and non-transitory computer-readable medium described herein may further include operations, features, means, or instructions for identifying, based on the resource configuration, a subset of TTIs within the repetition window during which a first repetition of the grant-free downlink transmission may be allowed to be transmitted, where the repetition window includes the subset of TTIs and at least one other TTI, and monitor for a first repetition of the grant-free downlink transmission during at least one TTI of the subset of TTIs.

In some examples of the method, apparatuses, and non-transitory computer-readable medium described herein, a redundancy version (RV) index of the first repetition of the grant-free downlink transmission may be zero (0).

Some examples of the method, apparatuses, and non-transitory computer-readable medium described herein may further include operations, features, means, or instructions for identifying a series of redundancy version (RV) indices for the repetition window based on the resource configuration, determine one or more potential RV indices for each TTI of the repetition window, where each potential RV index for each TTI may be based on the series of RV indices beginning at a respective TTI of the subset of TTIs, and attempt to decode the grant-free downlink transmission during a given TTI of the repetition window based on the one or more potential RV indices for the given TTI.

Some examples of the method, apparatuses, and non-transitory computer-readable medium described herein may further include operations, features, means, or instructions for identifying a series of redundancy version (RV) indices for the repetition window based on the resource configuration, identify a HARQ process identification (ID) for each TTI of the repetition window, where the HARQ process ID for each TTI may be based on the series of RV indices beginning at a respective TTI of the subset of TTIs, and combine logarithmic likelihood ratios (LLRs) of the grant-free downlink transmission for a given TTI with a previously received signal based on the HARQ process ID.

Some examples of the method, apparatuses, and non-transitory computer-readable medium described herein may further include operations, features, means, or instructions for failing to decode the first repetition of the grant-free downlink transmission during an initial TTI of the subset of TTIs, and attempt to decode the first repetition of the grant-free downlink transmission during an immediately subsequent TTI of the subset of TTIs based on failing to decode the first repetition during the initial TTI of the subset of TTIs.

Some examples of the method, apparatuses, and non-transitory computer-readable medium described herein may further include operations, features, means, or instructions for monitoring for a first repetition of the grant-free downlink transmission during any TTI of the repetition window, where the repetition window includes a set of TTIs.

Some examples of the method, apparatuses, and non-transitory computer-readable medium described herein may further include operations, features, means, or instructions for identifying a series of redundancy version (RV) indices for the repetition window based on the resource configuration, determine one or more potential RV indices for each TTI of the repetition window, where each potential RV index for each TTI may be based on the series of RV indices beginning at any TTI of the repetition window, and attempt to decode the grant-free downlink transmission during a given TTI of the repetition window based on the one or more potential RV indices for the given TTI.

Some examples of the method, apparatuses, and non-transitory computer-readable medium described herein may further include operations, features, means, or instructions for identifying a series of redundancy version (RV) indices for the repetition window based on the resource configuration, identify a HARQ process identification (ID) for each TTI of the repetition window, where the HARQ process ID for each TTI may be based on the series of RV indices beginning at any TTI of the repetition window, and combine logarithmic likelihood ratios (LLRs) of the grant-free downlink transmission for a given TTI with a previously received signal based on the HARQ process ID.

A method of wireless communication at a base station is described. The method may include transmitting, to a UE, a resource configuration for transmission of a downlink transmission within a repetition window, the resource configuration including an indicator of a repetition window size for the downlink transmission, and transmitting the downlink transmission, and transmitting the downlink transmission to the UE in accordance with the resource configuration.

An apparatus for wireless communication at a base station is described. The apparatus may include a processor, memory in electronic communication with the processor, and instructions stored in the memory. The instructions may be executable by the processor to cause the apparatus to transmit, to a UE, a resource configuration for transmission of a downlink transmission within a repetition window, the resource configuration including an indicator of a repetition window size for the downlink transmission, and transmit the downlink transmission to the UE in accordance with the resource configuration.

Another apparatus for wireless communication at a base station is described. The apparatus may include means for transmitting, to a UE, a resource configuration for transmission of a downlink transmission within a repetition window, the resource configuration including an indicator of a repetition window size for the downlink transmission, and means for transmitting the downlink transmission to the UE in accordance with the resource configuration.

A non-transitory computer-readable medium storing code for wireless communication at a base station is described. The code may include instructions executable by a processor to transmit, to a UE, a resource configuration for transmission of a downlink transmission within a repetition window, the resource configuration including an indicator of a repetition window size for the downlink transmission, and transmit the downlink transmission to the UE in accordance with the resource configuration.

Some examples of the method, apparatuses, and non-transitory computer-readable medium described herein may further include operations, features, means, or instructions for transmitting a first repetition of the downlink transmission during an initial TTI of the repetition window, the first repetition being associated with a first redundancy version (RV) index, and transmit one or more additional repetitions of the downlink transmission during one or more corresponding subsequent TTIs of the repetition window, each of the one or more additional repetitions being associated with a respective RV index.

In some examples of the method, apparatuses, and non-transitory computer-readable medium described herein, the downlink transmission may be a grant-free downlink transmission.

Some examples of the method, apparatuses, and non-transitory computer-readable medium described herein may further include operations, features, means, or instructions for identifying a subset of transmission time intervals (TTIs) within the repetition window during which a first repetition of the grant-free downlink transmission may be allowed to be transmitted, where the repetition window includes the subset of TTIs and at least one other TTI, transmit the first repetition of the grant-free downlink transmission during a TTI of the subset of TTIs, the first repetition being associated with a first redundancy version (RV) index, and transmit one or more additional repetitions of the grant-free downlink transmission during one or more corresponding subsequent TTIs of the at least one other TTI, each of the one or more additional repetitions being associated with a respective RV index.

A method of wireless communication at a UE is described. The method may include means for receiving a resource configuration for reception of a downlink transmission within a repetition window, the resource configuration including an indicator of a repetition window size for the downlink transmission, means for monitoring, in accordance with the resource configuration, one or more transmission time intervals (TTIs) of the repetition window for reception of the downlink transmission, and means for attempting to decode the downlink transmission during the one or more TTIs of the repetition window based on the repetition window size.

An apparatus for wireless communication at a UE is described. The apparatus may include a processor, memory in electronic communication with the processor, and instructions stored in the memory. The instructions may be executable by the processor to cause the apparatus to means for receiving a resource configuration for reception of a downlink transmission within a repetition window, the resource configuration including an indicator of a repetition window size for the downlink transmission, means for monitoring, in accordance with the resource configuration, one or more transmission time intervals (TTIs) of the repetition window for reception of the downlink transmission, and means for attempting to decode the downlink transmission during the one or more TTIs of the repetition window based on the repetition window size.

Another apparatus for wireless communication at a UE is described. The apparatus may include means for means for receiving a resource configuration for reception of a downlink transmission within a repetition window, the resource configuration including an indicator of a repetition window size for the downlink transmission, means for monitoring, in accordance with the resource configuration, one or more transmission time intervals (TTIs) of the repetition window for reception of the downlink transmission, and means for attempting to decode the downlink transmission during the one or more TTIs of the repetition window based on the repetition window size.

A non-transitory computer-readable medium storing code for wireless communication at a UE is described. The code may include instructions executable by a processor to means for receiving a resource configuration for reception of a downlink transmission within a repetition window, the resource configuration including an indicator of a repetition window size for the downlink transmission, means for monitoring, in accordance with the resource configuration, one or more transmission time intervals (TTIs) of the repetition window for reception of the downlink transmission, and means for attempting to decode the downlink transmission during the one or more TTIs of the repetition window based on the repetition window size.

A method of wireless communication at a base station is described. The method may include means for transmitting, to a UE, a resource configuration for transmission of a downlink transmission within a repetition window, the resource configuration including an indicator of a repetition window size for the downlink transmission and means for transmitting the downlink transmission to the UE in accordance with the resource configuration.

An apparatus for wireless communication at a base station is described. The apparatus may include a processor, memory in electronic communication with the processor, and instructions stored in the memory. The instructions may be executable by the processor to cause the apparatus to means for transmitting, to a UE, a resource configuration for transmission of a downlink transmission within a repetition window, the resource configuration including an indicator of a repetition window size for the downlink transmission and means for transmitting the downlink transmission to the UE in accordance with the resource configuration.

Another apparatus for wireless communication at a base station is described. The apparatus may include means for means for transmitting, to a UE, a resource configuration for transmission of a downlink transmission within a repetition window, the resource configuration including an indicator of a repetition window size for the downlink transmission and means for transmitting the downlink transmission to the UE in accordance with the resource configuration.

A non-transitory computer-readable medium storing code for wireless communication at a base station is described. The code may include instructions executable by a processor to means for transmitting, to a UE, a resource configuration for transmission of a downlink transmission within a repetition window, the resource configuration including an indicator of a repetition window size for the downlink transmission and means for transmitting the downlink transmission to the UE in accordance with the resource configuration.

A method of wireless communication at a UE, the code including instructions executable by a processor to is described. The method may include receiving a resource configuration for reception of a downlink transmission within a repetition window, the resource configuration including an indicator of a repetition window size for the downlink transmission, monitoring, in accordance with the resource configuration, one or more transmission time intervals (TTIs) of the repetition window for reception of the downlink transmission, and attempting to decode the downlink transmission during the one or more TTIs of the repetition window based on the repetition window size.

An apparatus for wireless communication at a UE, the code including instructions executable by a processor to is described. The apparatus may include a processor, memory in electronic communication with the processor, and instructions stored in the memory. The instructions may be executable by the processor to cause the apparatus to receive a resource configuration for reception of a downlink transmission within a repetition window, the resource configuration including an indicator of a repetition window size for the downlink transmission, monitor, in accordance with the resource configuration, one or more transmission time intervals (TTIs) of the repetition window for reception of the downlink transmission, and attempt to decode the downlink transmission during the one or more TTIs of the repetition window based on the repetition window size.

Another apparatus for wireless communication at a UE, the code including instructions executable by a processor to is described. The apparatus may include means for receiving a resource configuration for reception of a downlink transmission within a repetition window, the resource configuration including an indicator of a repetition window size for the downlink transmission, monitoring, in accordance with the resource configuration, one or more transmission time intervals (TTIs) of the repetition window for reception of the downlink transmission, and attempting to decode the downlink transmission during the one or more TTIs of the repetition window based on the repetition window size.

A non-transitory computer-readable medium storing code for wireless communication at a UE, the code including instructions executable by a processor to is described. The code may include instructions executable by a processor to receive a resource configuration for reception of a downlink transmission within a repetition window, the resource configuration including an indicator of a repetition window size for the downlink transmission, monitor, in accordance with the resource configuration, one or more transmission time intervals (TTIs) of the repetition window for reception of the downlink transmission, and attempt to decode the downlink transmission during the one or more TTIs of the repetition window based on the repetition window size.

A method of wireless communication at a base station, the code including instructions executable by a processor to is described. The method may include transmitting, to a UE, a resource configuration for transmission of a downlink transmission within a repetition window, the resource configuration including an indicator of a repetition window size for the downlink transmission and transmitting the downlink transmission to the UE in accordance with the resource configuration.

An apparatus for wireless communication at a base station, the code including instructions executable by a processor to is described. The apparatus may include a processor, memory in electronic communication with the processor, and instructions stored in the memory. The instructions may be executable by the processor to cause the apparatus to transmit, to a UE, a resource configuration for transmission of a downlink transmission within a repetition window, the resource configuration including an indicator of a repetition window size for the downlink transmission and transmit the downlink transmission to the UE in accordance with the resource configuration.

Another apparatus for wireless communication at a base station, the code including instructions executable by a processor to is described. The apparatus may include means for transmitting, to a UE, a resource configuration for transmission of a downlink transmission within a repetition window, the resource configuration including an indicator of a repetition window size for the downlink transmission and transmitting the downlink transmission to the UE in accordance with the resource configuration.

A non-transitory computer-readable medium storing code for wireless communication at a base station, the code including instructions executable by a processor to is described. The code may include instructions executable by a processor to transmit, to a UE, a resource configuration for transmission of a downlink transmission within a repetition window, the resource configuration including an indicator of a repetition window size for the downlink transmission and transmit the downlink transmission to the UE in accordance with the resource configuration.

DETAILED DESCRIPTION

Figure 1:
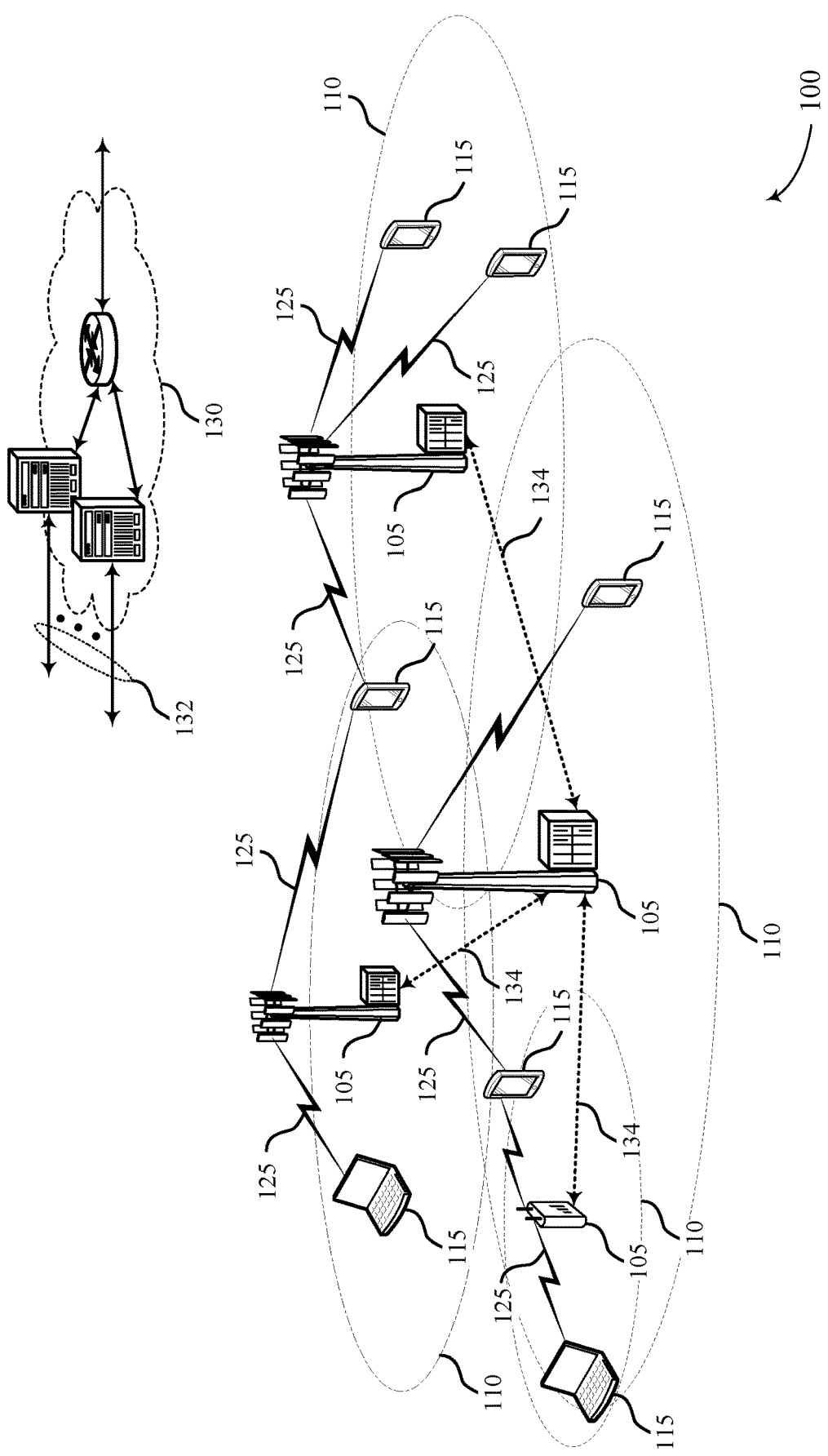
FIG. 1 illustrates an example of a wireless communications system that supports downlink transmission in accordance with aspects of the present disclosure.

Some wireless communications systems may support grant-free uplink transmissions (e.g., to reduce latency associated with scheduling request (SR) transmissions in grant-based uplink schemes). Similarly, grant-free transmission may be supported in the downlink (e.g., which may reduce control overhead associated with scheduling downlink transmissions). For example, the reduced control overhead may benefit low latency communication schemes which employ small packet sizes. In some cases, grant-free transmissions may be associated with increased complexity of decoding operations (e.g., because such transmissions are not scheduled by a grant and may therefore be associated with some degree of uncertainty in the decoding operation). Techniques are discussed herein to address such complexities. In some cases, aspects of the techniques discussed may be applied to grant-based downlink transmissions.

An example downlink transmission is provided in the context of activation-based transmissions. For activation-based transmissions, some downlink parameters may be set via radio resource control (RRC) configuration, while other parameters may be given by an activating downlink control information (DCI) transmission. By way of example, a hybrid automatic repeat request (HARQ) process identification (ID) and redundancy version (RV) index for each transmission in the activation-based scheme may be known (e.g., either based on DCI or as a function of the transmission time interval (TTI) index). As an example of activation-based transmissions, repetition-based activated downlink transmissions may employ a scheme in which the same transport block is sent (e.g., multiple times) in each repetition window. Based on the DCI and RRC-configured parameters, the HARQ process ID and RV index for each repetition of the transport block in the repetition window may be known. Any re-transmissions (e.g., based on a negative acknowledgement by the receiving device following the repetition window) may be transmitted using a grant-based scheme. In some cases, activation-based transmissions may be repetition-based activated uplink transmissions employing a scheme in which the same transport block is sent in each repetition window.

Alternatively, in an activation-less grant-free downlink transmission scheme, the UE may be configured with a set of parameters via RRC (e.g., time/frequency resources, transport block size (TBS), RV sequence, repetition window size, etc.) without receiving an activating DCI. Thus, the UE may attempt to blindly decode repeated instances of a downlink transmission over the given time/frequency resources (e.g., using different pairs of RV indices and HARQ process IDs) within a given repetition window. Aspects of the present disclosure relate to techniques for determining one or more potential RV indices and HARQ process IDs for each TTI of the repetition window (e.g., rather than searching across all possible pairings). Such techniques may benefit a UE in terms of power consumption, access latency, communication throughput, or the like.

In some cases, a wireless communications system may utilize an activation-less grant-free transmission scheme (e.g., for uplink, downlink, sidelink transmissions), where a receiving device (e.g., a UE, a base station) may be configured with a set of parameters (e.g., time/frequency resources, TBS sizes, RV sequence, repetition window size) without utilizing an activating DCI. Here, the receiving device may blindly decode repeated instances of the transmission over the given time/frequency resources. Here, similar techniques for determining one or more potential RV indices and HARQ process IDs for each TTI of the repetition window discussed herein may be applied to both uplink and downlink transmissions.

Aspects of the disclosure are initially described in the context of a wireless communications system. Aspects of the disclosure are then described in the context of timing diagrams and a process flow. Aspects of the disclosure are further illustrated by and described with reference to apparatus diagrams, system diagrams, and flowcharts that relate to grant-free downlink transmission.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a LTE network, an LTE-A network, an LTE-A Pro network, or a new radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use HARQ to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval. In some cases, multiple parallel HARQ processes (e.g., each associated with a respective HARQ process ID) may run concurrently. Each HARQ process may be based on transmissions of different redundancy versions of a transport block (e.g., where the different redundancy versions provide some level of diversity between transmissions, which diversity may be leveraged when combining the redundancy versions to decipher the transport block).

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a TTI. In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

In accordance with the described techniques, a UE 115 may receive a resource configuration for reception of a downlink transmission (e.g., a grant-free downlink transmission) within a repetition window from a base station 105. The resource configuration may, for example, include an indicator of a repetition window size for the downlink transmission. The UE 115 may monitor, in accordance with the resource configuration, one or more TTIs of the repetition window for reception of the downlink transmission from the base station 105. The UE 115 may attempt to decode the downlink transmission during the one or more TTIs of the repetition window based at least in part on the repetition window size. Using the described techniques, the UE 115 may efficiently determine one or more decoding parameters for the downlink transmission, thereby providing benefits in terms of latency reduction, power consumption, etc.

Figure 2:
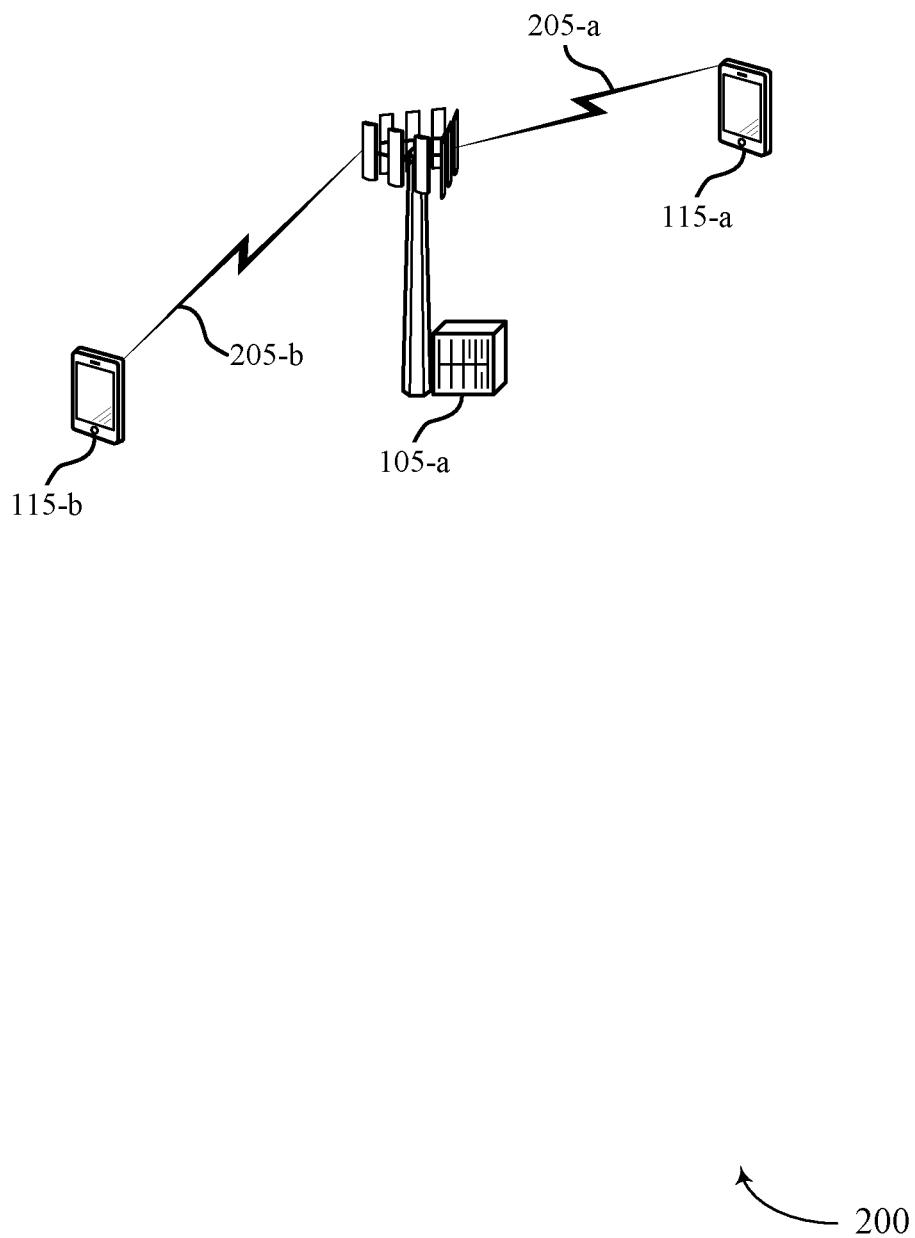
FIG. 2 illustrates an example of a wireless communications system that supports downlink transmission in accordance with aspects of the present disclosure.

FIG. 2 illustrates an example of a wireless communications system 200 that supports downlink transmission in accordance with various aspects of the present disclosure. In some examples, wireless communications system 200 may implement aspects of wireless communications system 100. Wireless communications system 200 includes base station 105-a, UE 115-a, and UE 115-b, each of which may be an example of the corresponding device described with reference to wireless communications system 100.

As illustrated, base station 105-a may be in communication with UE 115-a via wireless link 205-a and may be in communication with UE 115-b via wireless link 205-b. In some examples, wireless link 205-a and/or wireless link 205-b may support grant-free downlink transmissions. For example, wireless link 205-a may support URLLC for UE 115-a. In some cases, base station 105-a may configure UE 115-a with one or more parameters via higher layer signaling (e.g., RRC signaling). For example, the parameters may include one or more of time/frequency resources associated with a given repetition window, a TBS for transmissions within the repetition window, a number of TTIs in the repetition window (i.e., a repetition window size), a RV sequence, and the like. Thus, UE 115-a may support activation-less, repetition-based downlink transmissions as described herein. Additionally or alternatively, base station 105-a may configure UE 115-b with one or more parameters via higher layer signaling (e.g., RRC signaling). One or more parameters for UE 115-b may be the same as the parameters for UE 115-a, or each UE 115 may receive a unique set of parameters. By way of example, and as described further below, each of UE 115-a and UE 115-b may indicate a maximum supported repetition window size (e.g., in a capability report), and the respective repetition window sizes for each UE 115 may be based on the maximum supported repetition window sizes.

In some examples, information for multiple UEs 115 may be multiplexed on the time/frequency resources associated with the repetition window for UE 115-a. Because a transmission intended for UE 115-a within the repetition window may not be triggered (e.g., by a DCI transmission), UE 115-a may employ one or more of the techniques described herein to determine a HARQ process ID, a RV index, etc. for a transmission received within the repetition window.

As a first example, the repetition window size for UE 115-a may be one TTI (i.e., repetition-based transmission may not be configured). In some cases of the first example, HARQ re-transmissions may therefore be enabled. In each TTI (e.g., or in the TTIs configured by the RRC signaling), UE 115-a may attempt to blindly decode a transmission, such as a physical downlink shared channel (PDSCH) transmission. For example, the blind decoding may be based on iteratively applying potential pairings of HARQ process IDs and RV indices. That is, in each TTI UE 115-a may attempt to decode the PDSCH transmission assuming it is a first transmission (i.e., having a first RV index in the RV sequence configured by the RRC signaling and a HARQ process ID given by the TTI index). If this decoding attempt fails, UE 115-a may try decoding the PDSCH transmission assuming it is a subsequent transmission (i.e., having a subsequent RV index in the RV sequence configured by the RRC signaling). Thus, UE 115-a may attempt to combine the logarithmic likelihood ratios (LLRs) for the PDSCH transmission with any pending HARQ processes received some defined number of TTIs prior to the current TTI (e.g., which may be based on some predetermined rule or negotiated between UE 115-a and base station 105-a). By way of example, UE 115-a may expect to receive any retransmissions of a transport block received in a prior TTI in a given TTI that occurs after some predetermined (e.g., configured) time has elapsed. Thus, upon failing to decode the PDSCH transmission using a first RV index hypothesis (e.g., based on the RV sequence received in the RRC configuration), the UE 115-a may apply (e.g., iteratively) other candidate RV indices (e.g., and HARQ process IDs) based on a given periodicity associated with the HARQ retransmission process. Alternatively, the HARQ re-transmissions may be sent with a grant (e.g., a DCI transmission), which may address various complications of the scheme described herein. However, aspects of the scheme described herein may apply to repetition-based transmission schemes, as discussed with reference to FIGS. 3, 4, and 5.

Figure 3:
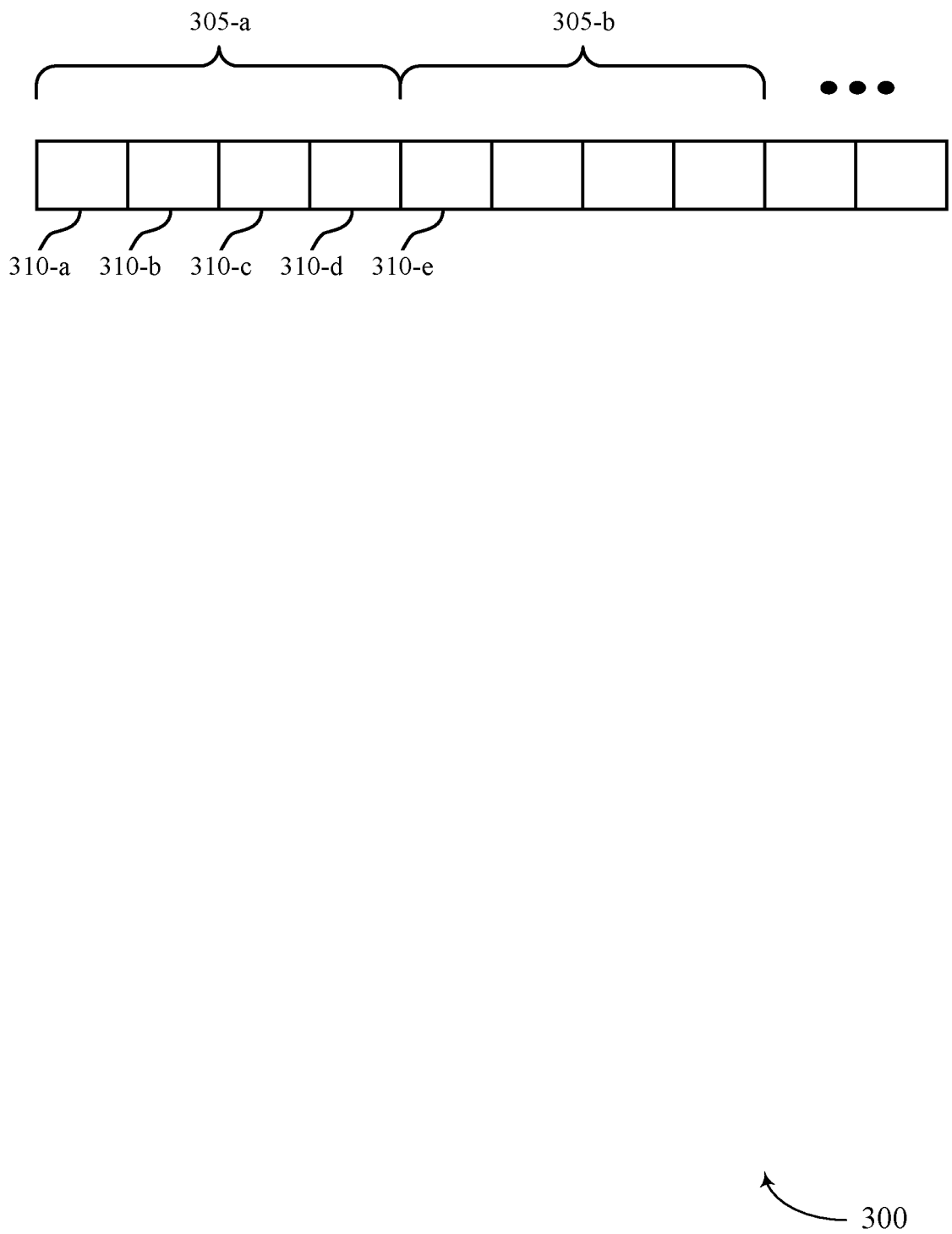
FIGS. 3 through 5 illustrate example timing diagrams that support grant-free downlink transmission in accordance with aspects of the present disclosure.

FIG. 3 illustrates an example of a timing diagram 300 that supports downlink transmission in accordance with various aspects of the present disclosure. In some examples, timing diagram 300 may implement aspects of wireless communication system 100.

Timing diagram 300 contains a plurality of TTIs 310, some of which may be grouped into repetition windows 305. In the present example, each repetition window 305 contains four (4) TTIs 310, though it is to be understood that other numbers of TTIs 310 may be included in each repetition window 305 (e.g., based on some UE-indicated capability) without deviating from the scope of the present disclosure. Similarly, while repetition window 305-a and repetition window 305-b are illustrated as being adjacent in time, it is to be understood that in some cases, the repetition windows 305 may occur with a given periodicity (e.g., one or more TTIs 310 may separate repetition window 305-a and repetition window 305-b) without deviating from the scope of the present disclosure.

Within repetition window 305-a, the same transport block may be sent multiple times (e.g., with different RVs). Repetition window 305-a may thus employ a RV sequence (e.g., configured via RRC signaling) for each TTI 310. By way of example, the RV sequence may be [0, 2, 3, 1] such that RV 0 is sent in TTI 310-a, RV 2 is sent in TTI 310-b, RV 3 is sent in TTI 310-c, and RV 1 is sent in TTI 310-d. In the case that repetition window 305-a contains more than four (4) TTIs 310, the RV sequence (or a portion thereof) may repeat, Thus, a UE 115 monitoring resources of repetition window 305-a may only expect to receive a new transport block (e.g., RV 0) during TTI 310-a.

In some cases, the TTIs 310 may be transmitted within a grant-free downlink transmission. The UE 115 may therefore infer both the HARQ process ID (e.g., based on the TTI index of TTI 310-a) and RV index (e.g., based on the RV sequence applied to the TTIs 310 of repetition window 305). Here, the index of the first TTI 310-a may indicate (e.g., implicitly) a HARQ process ID. For example, a receiver (e.g., UE 115, base station 105) may perform blind decodes based on the RV sequence applied to the TTIs 310 and then determine the index of the first TTI 310-a. Based on the index of TTI 310-a, the receiver may then determine the HARQ process ID. Accordingly, the number of blind decoding attempts for each TTI 310 may be reduced compared to the search described with reference to FIG. 2 (e.g., only one decoding hypothesis may be attempted for each TTI 310). In some other cases, the TTIs 310 may be transmitted within a grant-based downlink transmission. The receiver may know (e.g., based on DCI signaling from a base station) the HARQ process ID and RV index.

Figure 4:
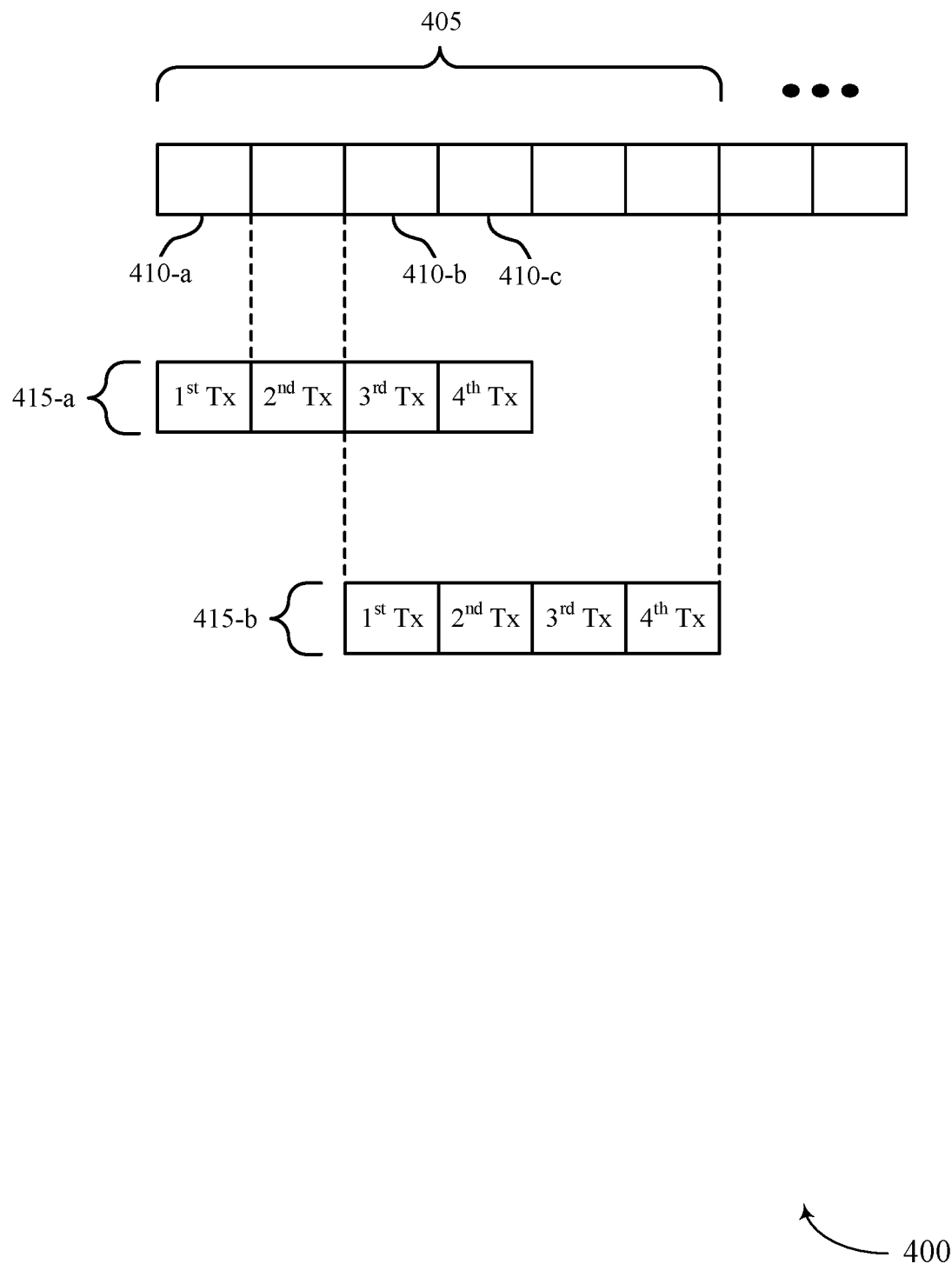

FIG. 4 illustrates an example of a timing diagram 400 that supports downlink transmission in accordance with various aspects of the present disclosure. In some examples, timing diagram 400 may implement aspects of wireless communication system 100. Timing diagram 400 contains a plurality of TTIs 410, some of which may be grouped into repetition window 405. In the present example, repetition window 405 contains six (6) TTIs 410, though it is to be understood that other numbers of TTIs 410 may be included in repetition window 405 (e.g., based on some UE-indicated capability) without deviating from the scope of the present disclosure.

Within repetition window 405, the same transport block may be sent multiple times (e.g., with different RVs). In accordance with the present disclosure, a subset of the TTIs 410 in repetition window 405 may contain a new transport block (e.g., having RV 0). By way of example, the new transport block may be contained in TTI 410-a or TTI 410-b (e.g., but not TTI 410-c). Thus, a UE 115 may attempt to blindly decode a PDSCH transmission in TTI 410-a using a first RV index in a RV sequence received via RRC configuration and a HARQ process ID given by an index of TTI 410-a. If the decoding attempt is successful, the UE 115 may subsequently attempt to decode a second repetition of the transport block (e.g., having a second RV index in the RV sequence received via RRC signaling) in a second TTI 410 of timing alignment 415-a. Alternatively (e.g., if the decoding attempt for the first RV index at TTI 410-a and the decoding attempt for the second RV index at the second TTI 410 of repetition window 405), the UE 115 may attempt to blindly decode the PDSCH transmission in TTI 410-b using the first RV index (e.g., assuming that the PDSCH transmission is sent according to timing alignment 415-b). If this decoding attempt fails, the UE 115 may attempt to blindly decode the PDSCH transmission in TTI 410-b using the third RV index in the RV sequence (e.g., assuming that the PDSCH transmission is sent according to timing alignment 415-a despite the previously failed decoding attempts, which may be due to interference, lack of signal, etc.).

Figure 5:
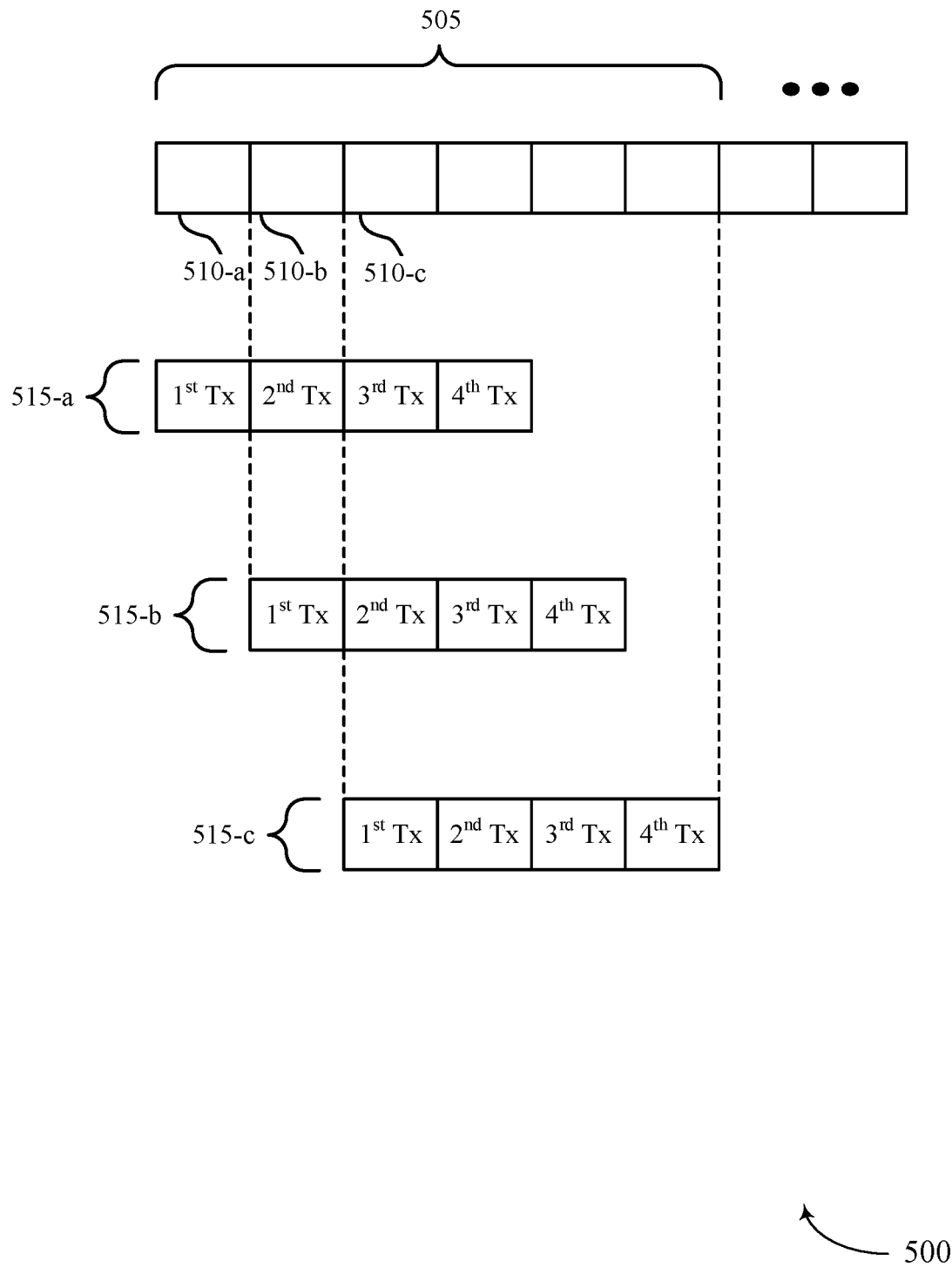

FIG. 5 illustrates an example of a timing diagram 500 that supports downlink transmission in accordance with various aspects of the present disclosure. In some examples, timing diagram 500 may implement aspects of wireless communication system 100. Timing diagram 500 contains a plurality of TTIs 510, some of which may be grouped into repetition window 505. In the present example, repetition window 505 contains six (6) TTIs 510, though it is to be understood that other numbers of TTIs 510 may be included in repetition window 505 (e.g., based on some UE-indicated capability) without deviating from the scope of the present disclosure.

Within repetition window 405, the same transport block may be sent multiple times (e.g., with different RVs). In accordance with the present disclosure, each TTI 510 in repetition window 505 may contain a new transport block (e.g., having RV 0). By way of example, the new transport block may be contained in TTI 510-a (e.g., as illustrated by timing alignment 515-a), TTI 510-b (e.g., as illustrated by timing alignment 515-b), TTI 510-c (e.g., as illustrated by timing alignment 515-c), etc. Thus, a UE 115 may attempt to blindly decode a PDSCH transmission in TTI 510-a using a first RV index in a RV sequence received via RRC configuration and a HARQ process ID given by an index of TTI 510-a. If the decoding attempt is successful, the UE 115 may subsequently attempt to decode a second transport block (e.g., corresponding to timing alignment 515-b or timing alignment 515-c) in TTI 510-b.

Alternatively (e.g., if the decoding attempt for the first RV index at TTI 510-a is unsuccessful), the UE 115 may attempt to decode the PDSCH transmission in TTI 510-b using the first RV index (e.g., assuming that the PDSCH transmission is sent according to timing alignment 515-b) and the HARQ process ID corresponding to TTI 510-b. If this decoding attempt fails, the UE 115 may attempt to blindly decode the PDSCH transmission in TTI 510-b using the second RV index in the RV sequence (e.g., assuming that the PDSCH transmission is sent according to timing alignment 515-b) and the HARQ process ID corresponding to TTI 510-a. Similarly, if these decoding attempts fail, the UE 115 may attempt to decode the PDSCH transmission in TTI 510-c according to timing alignment 515-c (e.g., using the first RV index and the HARQ process ID corresponding to TTI 510-c), followed by timing alignment 515-b (e.g., using the second RV index and the HARQ process ID corresponding to TTI 510-b), followed by timing alignment 515-a (e.g., using the third RV index and the HARQ process ID corresponding to TTI 510-c). The decoding attempts may be performed in a different order (e.g., the UE 115 may attempt to decode the PDSCH transmission in TTI 510-c according to timing alignment 515-a before attempting to decode the PDSCH transmission according to timing alignment 515-b) without deviating from the scope of the present disclosure.

Thus, in some cases, as the size of repetition window 505 increases, the UE 115 may experience a corresponding increase in blind decoding attempts (e.g., for TTIs 510 later in the repetition window 505) based on the additional potential timing alignment 515 introduced at each TTI 510. Accordingly, there may in some cases be a repetition window 505 threshold (e.g., above which grant-based downlink transmissions may be performed and below which grant-free downlink transmissions may be performed). As discussed herein, the length of the repetition window 505 may in some cases be an example of a UE 115 capability (e.g., which may be conveyed via RRC signaling or otherwise communicated to a base station 105).

Figure 6:
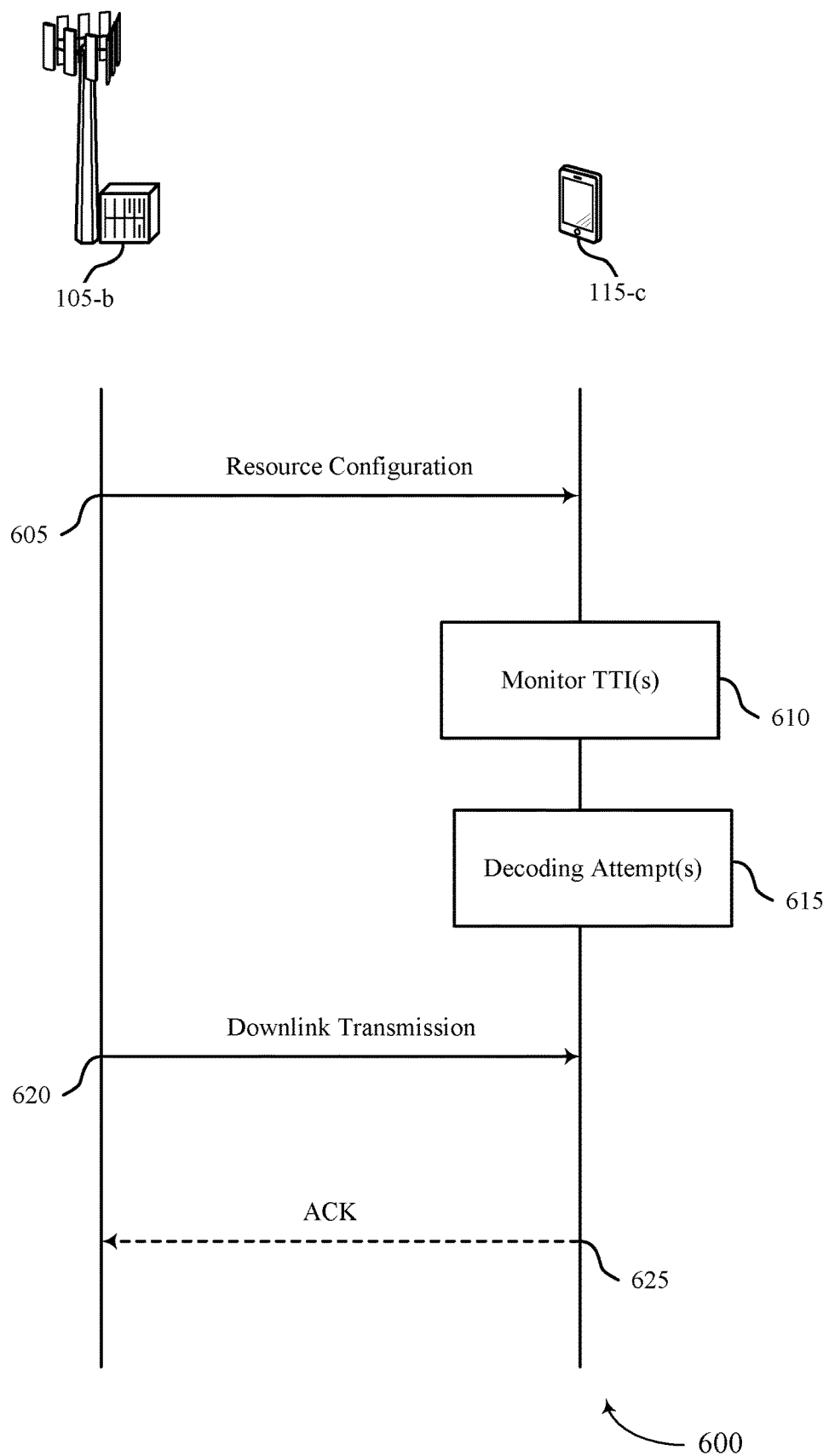
FIG. 6 illustrates an example of a process flow that supports downlink transmission in accordance with aspects of the present disclosure.

FIG. 6 illustrates an example of a process flow 600 that supports downlink transmission in accordance with various aspects of the present disclosure. In some examples, process flow 600 may implement aspects of wireless communication system 100. For example, process flow 600 includes base station 105-b and UE 115-c, each of which may be an example of the corresponding devices described with reference to FIGS. 1 and 2.

At 605, base station 105-b may transmit (e.g., and UE 115-c may receive) a resource configuration for reception of a grant-free downlink transmission within a repetition window. For example, the resource configuration may include an indicator of a repetition window size for the grant-free downlink transmission. Additionally or alternatively, the resource configuration may include a series of RV indices (i.e., a RV sequence), a TBS, time/frequency resources associated with the repetition window, etc. In some cases, the resource configuration may be sent via RRC signaling. In some examples, the repetition window size may be based at least in part on a capability of UE 115-c (e.g., which may be communicated to base station 105-b prior to 605). For example, the capability may indicate a maximum repetition window size supported by UE 115-c, a timing within the repetition window for which UE 115-c supports transmission of a first repetition of the grant-free downlink transmission (e.g., where possible different timings for the first repetition are discussed with reference to FIG. 3, FIG. 4, and FIG. 5), or combinations of the same.

At 610, UE 115-c may monitor, in accordance with the resource configuration, one or more TTIs of the repetition window for reception of the grant-free downlink transmission. For example, UE 115-c may monitor for a first repetition of the grant-free downlink transmission in an initial TTI of the repetition window (e.g., as described with reference to FIG. 3). Additionally or alternatively, UE 115-c may identify, based at least in part on the resource configuration, a subset of TTIs within the repetition window during which the grant-free downlink transmission is allowed to be transmitted and monitor for a first repetition of the grant-free downlink transmission during at least one TTI of the subset of TTIs (e.g., as described with reference to FIG. 4). Additionally or alternatively, UE 115c may monitor for a first repetition of the grant-free downlink transmission during any TTI of the repetition window (e.g., as described with reference to FIG. 5).

At 615, UE 115-c may attempt to decode the grant-free downlink transmission during the one or more TTIs of the repetition window based at least in part on the repetition window size. For example, UE 115-c may identify a potential RV index and a corresponding HARQ process ID for the grant-free downlink transmission, where each decoding attempt is based on a unique pair of potential RV index and corresponding HARQ process ID. In some cases, UE 115-c may determine a TTI index for each of the one or more TTIs of the repetition window, where the corresponding HARQ process ID for a given TTI is based at least in part on the TTI index for the given TTI. In some cases, UE 115-c may identify a series of RV indices for the repetition window based at least in part on the resource configuration, each RV index of the series of RV indices associated with a respective TTI of the repetition window and attempt to decode the grant-free downlink transmission during a given TTI of the repetition window based at least in part on the RV index associated with the given TTI (e.g., as described with reference to FIG. 3).

Additionally or alternatively, at 615, UE 115-c may identify a series of RV indices for the repetition window based at least in part on the resource configuration, determine one or more potential RV indices for each TTI of the repetition window, where each potential RV index for each TTI is based at least in part on the series of RV indices beginning at a respective TTI of the subset of TTIs, and attempt to decode the grant-free downlink transmission during a given TTI of the repetition window based at least in part on the one or more potential RV indices for the given TTI (e.g., as described with reference to FIG. 4). For example, UE 115-c may fail to decode the first repetition of the grant-free downlink transmission during an initial TTI of the subset of TTIs and attempt to decode the first repetition of the grant-free downlink transmission during an immediately subsequent TTI of the subset of TTIs based at least in part on failing to decode the first repetition during the initial TTI of the subset of TTIs (e.g., as described with reference to FIG. 4).

Additionally or alternatively, at 615, UE 115-c may identifying a series of RV indices for the repetition window based at least in part on the resource configuration, determine one or more potential RV indices for each TTI of the repetition window, where each potential RV index for each TTI is based at least in part on the series of RV indices beginning at any TTI of the repetition window, and attempt to decode the grant-free downlink transmission during a given TTI of the repetition window based at least in part on the one or more potential RV indices for the given TTI (e.g., as described with reference to FIG. 5). For example, UE 115-c may determine that a first decoding hypothesis corresponding to decoding the first repetition of the grant-free downlink transmission during a given TTI of the repetition window has failed and attempt to decode a second repetition of the grant-free downlink transmission using a second decoding hypothesis during the given TTI of the repetition window based at least in part on the determination that the first decoding hypothesis has failed (e.g., as described with reference to FIG. 5). In some cases, UE 115-c may attempt to decode the first repetition of the grant-free downlink transmission using an additional decoding hypothesis during a subsequent TTI of the repetition window based at least in part on the determination that the first decoding hypothesis has failed (e.g., as described with reference to FIG. 5).

At 620, base station 105-b may transmit the grant-free downlink transmission to the UE in accordance with the resource configuration. In some cases, base station 105-b may transmit a first repetition of the grant-free downlink transmission during an initial TTI of the repetition window, the first repetition being associated with a first RV index and transmit one or more additional repetitions of the grant-free downlink transmission during one or more corresponding subsequent TTIs of the repetition window, each of the one or more additional repetitions being associated with a respective RV index (e.g., as described with reference to FIG. 3). In some cases, base station 105-b may identify a subset of TTIs within the repetition window during which a first repetition of the grant-free downlink transmission is allowed to be transmitted, where the repetition window includes the subset of TTIs and at least one other TTI, transmit the first repetition of the grant-free downlink transmission during a TTI of the subset of TTIs, the first repetition being associated with a first RV index, and transmit one or more additional repetitions of the grant-free downlink transmission during one or more corresponding subsequent TTIs of the at least one other TTI, each of the one or more additional repetitions being associated with a respective RV index (e.g., as described with reference to FIG. 4). In some cases, base station 105-b may transmit a first repetition of the grant-free downlink transmission during any TTI of the repetition window, the first repetition being associated with a first RV index and transmit one or more additional repetitions of the grant-free downlink transmission during one or more corresponding subsequent TTIs of the repetition window, each of the one or more additional repetitions being associated with a respective RV index (e.g., as described with reference to FIG. 5). Thus, in some cases the operations at 620 (i.e., the transmission(s) from base station 105-b) may overlap in time with the operations at 615 (i.e., the decoding attempt(s) at UE 115-c).

At 625, UE 115-c may optionally transmit (e.g., and base station 105-b may receive) an indication (e.g., an acknowledgment (ACK)) that the grant-free downlink transmission was successfully decoded (e.g., after a conclusion of the repetition window).

Figure 7:
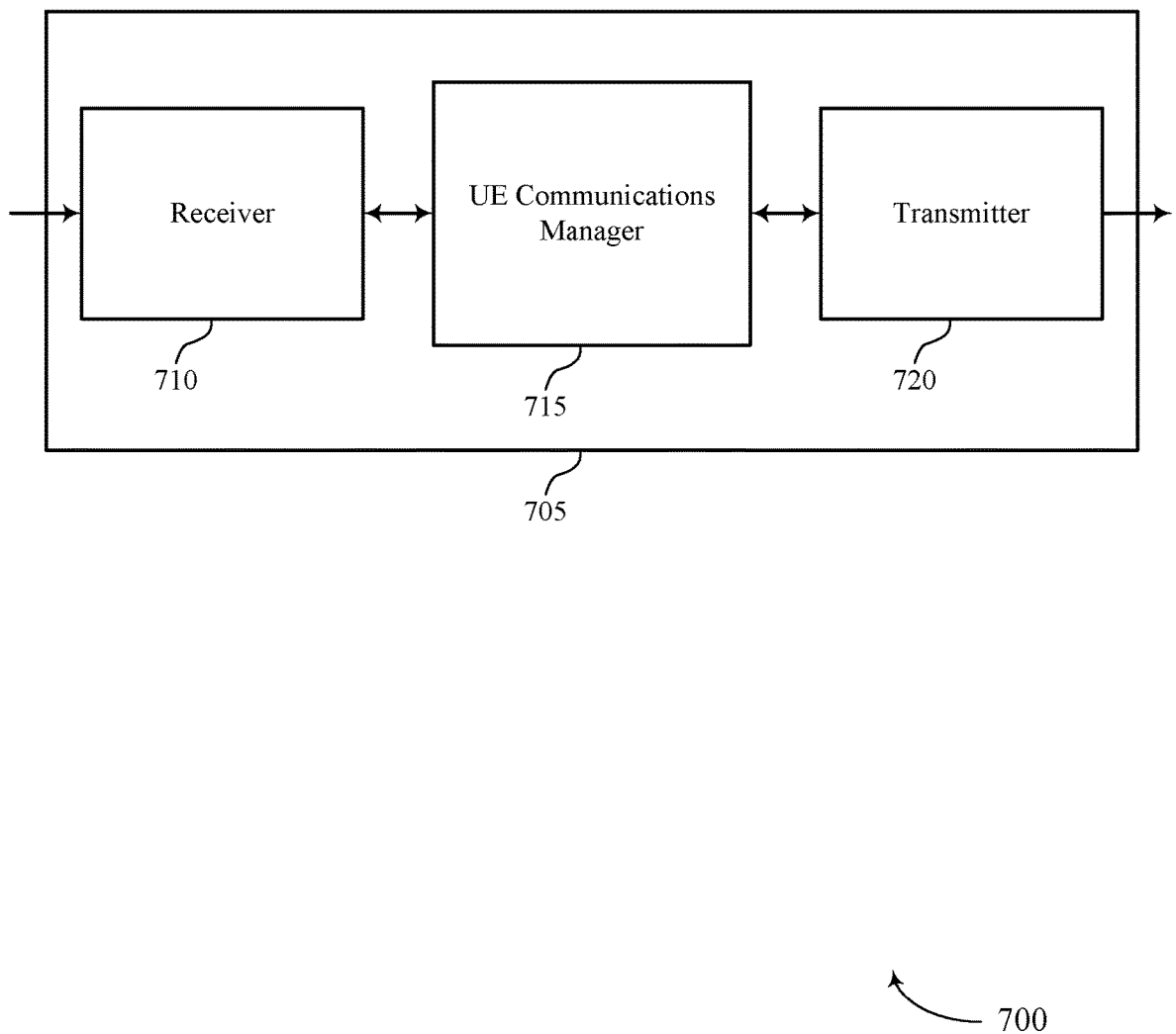
FIGS. 7 and 8 show block diagrams of a device that supports downlink transmission in accordance with aspects of the present disclosure.

FIG. 7 shows a block diagram 700 of a wireless device 705 that supports downlink transmission in accordance with aspects of the present disclosure. Wireless device 705 may be an example of aspects of a UE 115 as described herein. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to grant-free downlink transmission, etc.). Information may be passed on to other components of the device. The receiver 710 may be an example of aspects of the transceiver 1035 described with reference to FIG. 10. The receiver 710 may utilize a single antenna or a set of antennas.

UE communications manager 715 may be an example of aspects of the UE communications manager 1015 described with reference to FIG. 10. UE communications manager 715 and/or at least some of its various sub-components may be implemented in hardware, software executed by a processor, firmware, or any combination thereof. If implemented in software executed by a processor, the functions of the UE communications manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

UE communications manager 715 and/or at least some of its various sub-components may be physically located at various positions, including being distributed such that portions of functions are implemented at different physical locations by one or more physical devices. In some examples, UE communications manager 715 and/or at least some of its various sub-components may be a separate and distinct component in accordance with various aspects of the present disclosure. In other examples, UE communications manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 715 may receive a resource configuration for reception of a downlink transmission within a repetition window, the resource configuration including an indicator of a repetition window size for the downlink transmission. UE communications manager 715 may monitor, in accordance with the resource configuration, one or more TTIs of the repetition window for reception of the downlink transmission. UE communications manager 715 may attempt to decode the downlink transmission during the one or more TTIs of the repetition window based on the repetition window size.

Transmitter 720 may transmit signals generated by other components of the device. In some examples, the transmitter 720 may be collocated with a receiver 710 in a transceiver module. For example, the transmitter 720 may be an example of aspects of the transceiver 1035 described with reference to FIG. 10. The transmitter 720 may utilize a single antenna or a set of antennas.

Figure 8:
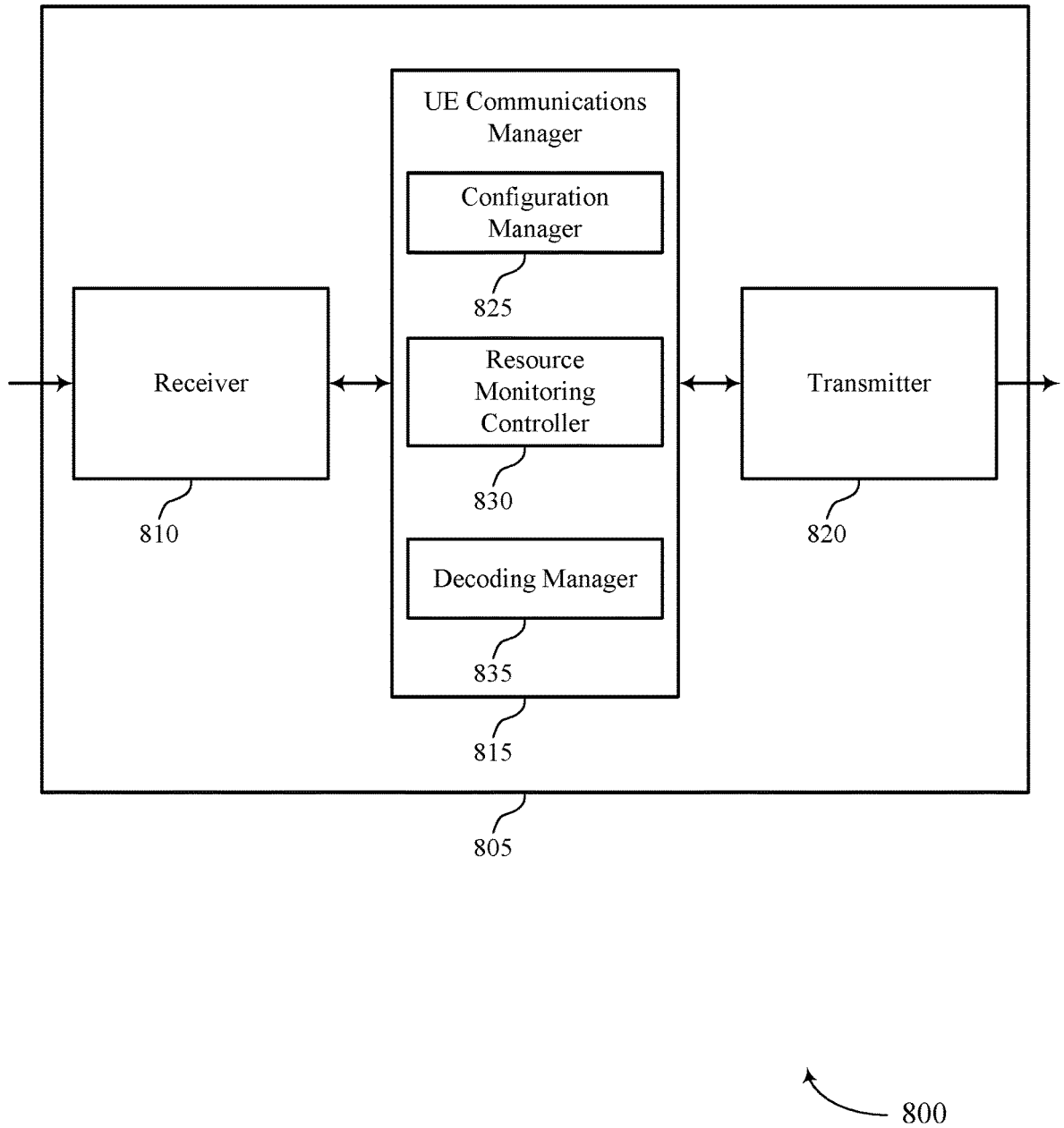

FIG. 8 shows a block diagram 800 of a wireless device 805 that supports downlink transmission in accordance with aspects of the present disclosure. Wireless device 805 may be an example of aspects of a wireless device 705 or a UE 115 as described with reference to FIG. 7. Wireless device 805 may include receiver 810, UE communications manager 815, and transmitter 820. Wireless device 805 may also include a processor. Each of these components may be in communication with one another (e.g., via one or more buses). UE communications manager 815 may be an example of aspects of the UE communications manager 1015 described with reference to FIG. 10. UE communications manager 815 may also include configuration manager 825, resource monitoring controller 830, and decoding manager 835.

Receiver 810 may receive information such as packets, user data, or control information associated with various information channels (e.g., control channels, data channels, and information related to grant-free downlink transmission, etc.). Information may be passed on to other components of the device. The receiver 810 may be an example of aspects of the transceiver 1035 described with reference to FIG. 10. The receiver 810 may utilize a single antenna or a set of antennas.

Configuration manager 825 may receive a resource configuration for reception of a downlink transmission within a repetition window, the resource configuration including an indicator of a repetition window size for the downlink transmission. In some cases, the resource configuration is received via RRC signaling. In some cases, the resource configuration includes a series of RV indices for repeated transmissions of the downlink transmission within the repetition window, a TBS, an indication of time/frequency resources, or combinations thereof.

Resource monitoring controller 830 may monitor, in accordance with the resource configuration, one or more TTIs of the repetition window for reception of the downlink transmission. In some cases, monitoring the one or more TTIs of the repetition window for reception of the downlink transmission includes identifying, based on the resource configuration, a subset of TTIs within the repetition window during which a first repetition of the downlink transmission, which may be a grant-free downlink transmission, is allowed to be transmitted, where the repetition window includes the subset of TTIs and at least one other TTI. For example, resource monitoring controller 830 may monitor for a first repetition of the grant-free downlink transmission during at least one TTI of the subset of TTIs. In some cases, monitoring the one or more TTIs of the repetition window for reception of the grant-free downlink transmission includes monitoring for a first repetition of the grant-free downlink transmission during any TTI of the repetition window, where the repetition window includes multiple TTIs. In some cases, monitoring the one or more TTIs of the repetition window for reception of the grant-free downlink transmission includes monitoring for a first repetition of the grant-free downlink transmission in an initial TTI of the repetition window, where the repetition window size is greater than one TTI.

Decoding manager 835 may attempt to decode the downlink transmission during the one or more TTIs of the repetition window based on the repetition window size. In some cases, attempting to decode the downlink transmission, which may be a grant-free downlink transmission, includes identifying a series of RV indices for the repetition window based on the resource configuration. In some cases, each RV index of the series of RV indices is associated with a respective TTI of the repetition window. In some cases, attempting to decode the grant-free downlink transmission includes identifying a potential RV index and a corresponding HARQ process ID for the grant-free downlink transmission, where each decoding attempt is based on a unique pair of potential RV index and corresponding HARQ process ID. In some cases, identifying the potential RV index and the corresponding HARQ process ID for the grant-free downlink transmission includes determining a TTI index for each of the one or more TTIs of the repetition window, where the corresponding HARQ process ID for a given TTI is based on the TTI index for the given TTI.

Decoding manager 835 may determine one or more potential RV indices for each TTI of the repetition window, where each potential RV index for each TTI is based on the series of RV indices beginning at a respective TTI of the subset of TTIs. Decoding manager 835 may determine one or more potential RV indices for each TTI of the repetition window, where each potential RV index for each TTI is based on the series of RV indices beginning at any TTI of the repetition window. Decoding manager 835 may attempt to decode the grant-free downlink transmission during a given TTI of the repetition window based on the one or more potential RV indices for the given TTI.

Decoding manager 835 may determine that a first decoding hypothesis corresponding to decoding the first repetition of the downlink transmission during a given TTI of the repetition window has failed. Decoding manager 835 may attempt to decode a second repetition of the downlink transmission, which may be a grant-free downlink transmission, using a second decoding hypothesis during the given TTI of the repetition window based on the determination that the first decoding hypothesis has failed. Decoding manager 835 may attempt to decode the first repetition of the grant-free downlink transmission using an additional decoding hypothesis during a subsequent TTI of the repetition window based on the determination that the first decoding hypothesis has failed. Decoding manager 835 may attempt to decode the first repetition of the grant-free downlink transmission during an immediately subsequent TTI of the subset of TTIs based on failing to decode the first repetition during the initial TTI of the subset of TTIs. Decoding manager 835 may transmit an indication that the downlink transmission was successfully decoded.

Decoding manager 835 may identify a series of RV indices for the repetition window based at least in part on the resource configuration. Decoding manager 835 may identify a HARQ process ID for each TTI of the repetition window, where the HARQ process ID for each TTI is based at least in part on the series of RV indices beginning at a respective TTI of the subset of TTIs. Decoding manager 835 may combine LLRs of the grant-free downlink transmission for a given TTI with a previously received signal based at least in part on the HARQ process ID. Decoding manager 835 may identify a HARQ process ID for each TTI of the repetition window, where the HARQ process ID for each TTI is based at least in part on the series of RV indices beginning at any TTI of the repetition window. Decoding manager 835 may combine LLRs of the grant-free downlink transmission for a given TTI with a previously received signal based at least in part on the HARQ process ID.

Transmitter 820 may transmit signals generated by other components of the device. In some examples, the transmitter 820 may be collocated with a receiver 810 in a transceiver module. For example, the transmitter 820 may be an example of aspects of the transceiver 1035 described with reference to FIG. 10. The transmitter 820 may utilize a single antenna or a set of antennas.

Figure 9:
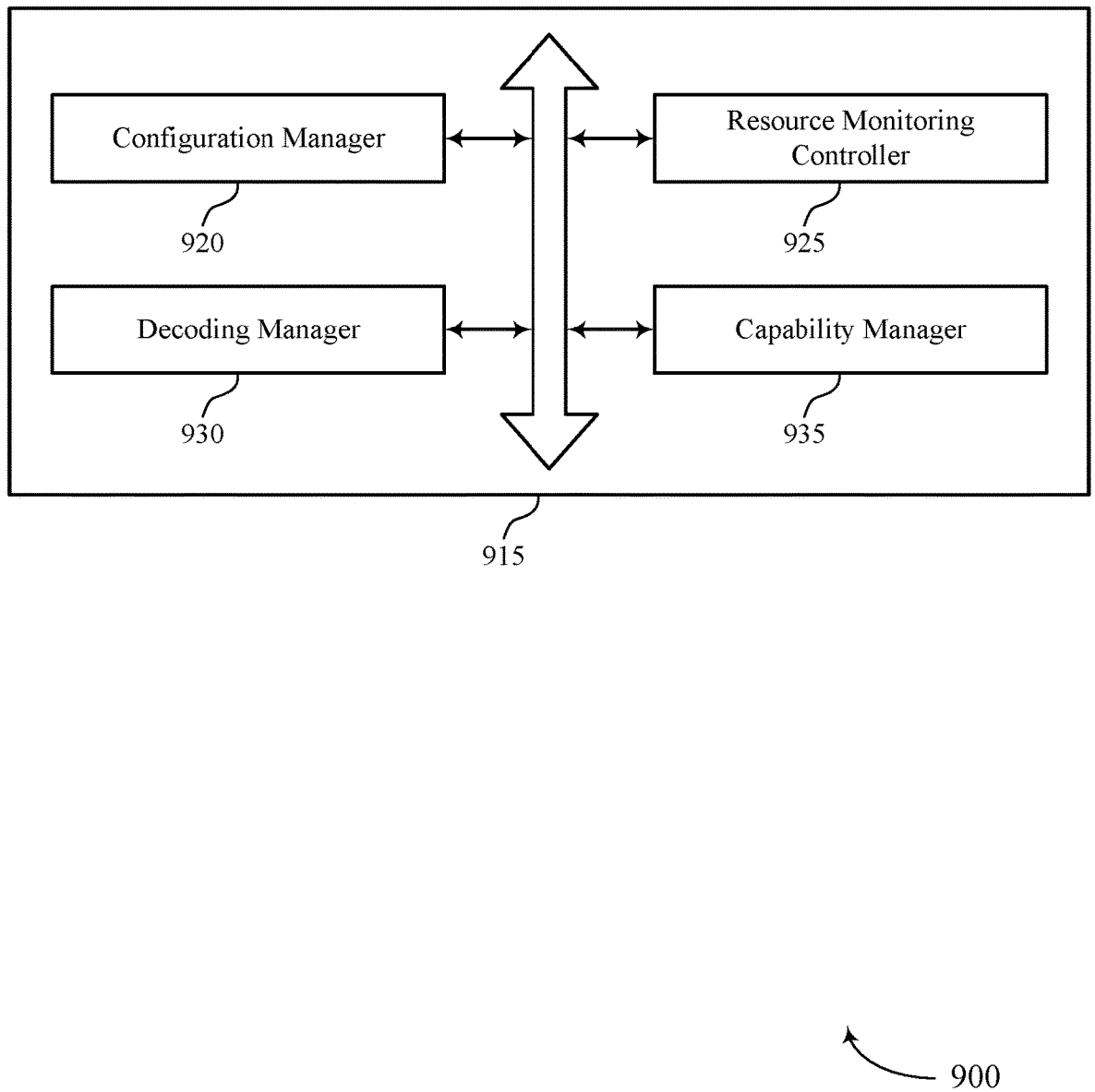
FIG. 9 illustrates a user equipment (UE) communications manager that supports downlink transmission in accordance with aspects of the present disclosure.

FIG. 9 shows a block diagram 900 of a UE communications manager 915 that supports downlink transmission in accordance with aspects of the present disclosure. The UE communications manager 915 may be an example of aspects of a UE communications manager 715, a UE communications manager 815, or a UE communications manager 1015 described with reference to FIGS. 7, 8, and 10. The UE communications manager 915 may include configuration manager 920, resource monitoring controller 925, decoding manager 930, and capability manager 935. Each of these modules may communicate, directly or indirectly, with one another (e.g., via one or more buses).

Configuration manager 920 may receive a resource configuration for reception of a downlink transmission within a repetition window, the resource configuration including an indicator of a repetition window size for the downlink transmission. In some cases, the resource configuration is received via RRC signaling. In some cases, the resource configuration includes a series of RV indices for repeated transmissions of the downlink transmission within the repetition window, a TBS, an indication of time/frequency resources, or combinations thereof.

Resource monitoring controller 925 may monitor, in accordance with the resource configuration, one or more TTIs of the repetition window for reception of the downlink transmission. In some cases, monitoring the one or more TTIs of the repetition window for reception of the downlink transmission, which may be a grant-free downlink transmission, includes identifying, based on the resource configuration, a subset of TTIs within the repetition window during which a first repetition of the grant-free downlink transmission is allowed to be transmitted, where the repetition window includes the subset of TTIs and at least one other TTI. For example, resource monitoring controller 925 may monitor for a first repetition of the grant-free downlink transmission during at least one TTI of the subset of TTIs. In some cases, monitoring the one or more TTIs of the repetition window for reception of the grant-free downlink transmission includes monitoring for a first repetition of the grant-free downlink transmission during any TTI of the repetition window, where the repetition window includes multiple TTIs. In some cases, monitoring the one or more TTIs of the repetition window for reception of the downlink transmission includes monitoring for a first repetition of the downlink transmission in an initial ITT of the repetition window, where the repetition window size is greater than one TTI.

Decoding manager 930 may attempt to decode the downlink transmission during the one or more TTIs of the repetition window based on the repetition window size. In some cases, attempting to decode the downlink transmission, which may be a grant-free downlink transmission, includes identifying a series of RV indices for the repetition window based on the resource configuration. In some cases, each RV index of the series of RV indices is associated with a respective TTI of the repetition window. In some cases, attempting to decode the grant-free downlink transmission includes identifying a potential RV index and a corresponding HARQ process ID for the grant-free downlink transmission, where each decoding attempt is based on a unique pair of potential RV index and corresponding HARQ process ID. In some cases, identifying the potential RV index and the corresponding HARQ process ID for the grant-free downlink transmission includes determining a TTI index for each of the one or more TTIs of the repetition window, where the corresponding HARQ process ID for a given TTI is based on the TTI index for the given TTI.

Decoding manager 930 may determine one or more potential RV indices for each TTI of the repetition window, where each potential RV index for each TTI is based on the series of RV indices beginning at a respective TTI of the subset of TTIs. Decoding manager 930 may determine one or more potential RV indices for each TTI of the repetition window, where each potential RV index for each TTI is based on the series of RV indices beginning at any TTI of the repetition window. Decoding manager 930 may attempt to decode the grant-free downlink transmission during a given TTI of the repetition window based on the one or more potential RV indices for the given TTI.

Decoding manager 930 may determine that a first decoding hypothesis corresponding to the first repetition of the grant-free downlink transmission during a given TTI of the repetition window has failed. Decoding manager 930 may attempt to decode a second repetition of the grant-free downlink transmission using a second decoding hypothesis during the given TTI of the repetition window based on the determination that the first decoding hypothesis has failed. Decoding manager 930 may attempt to decode the first repetition of the grant-free downlink transmission using an additional decoding hypothesis during a subsequent TTI of the repetition window based on the determination that the first decoding hypothesis has failed. Decoding manager 930 may attempt to decode the first repetition of the grant-free downlink transmission during an immediately subsequent TTI of the subset of TTIs based on failing to decode the first repetition during the initial TTI of the subset of TTIs. Decoding manager 930 may transmit an indication that the downlink transmission was successfully decoded.

Decoding manager 930 may identify a series of RV indices for the repetition window based at least in part on the resource configuration. Decoding manager 930 may identify a HARQ process ID for each TTI of the repetition window, where the HARQ process ID for each TTI is based at least in part on the series of RV indices beginning at a respective TTI of the subset of TTIs. Decoding manager 930 may combine LLRs of the grant-free downlink transmission for a given TTI with a previously received signal based at least in part on the HARQ process ID. Decoding manager 930 may identify a HARQ process ID for each TTI of the repetition window, where the HARQ process ID for each TTI is based at least in part on the series of RV indices beginning at any TTI of the repetition window. Decoding manager 930 may combine LLRs of the grant-free downlink transmission for a given TTI with a previously received signal based at least in part on the HARQ process ID.

Capability manager 935 may transmit an indication of a capability of the UE, the capability indicating a maximum repetition window size supported by the UE, a timing within the repetition window for which the UE supports transmission of a first repetition of the grant-free downlink transmission, or combinations of the same.

Figure 10:
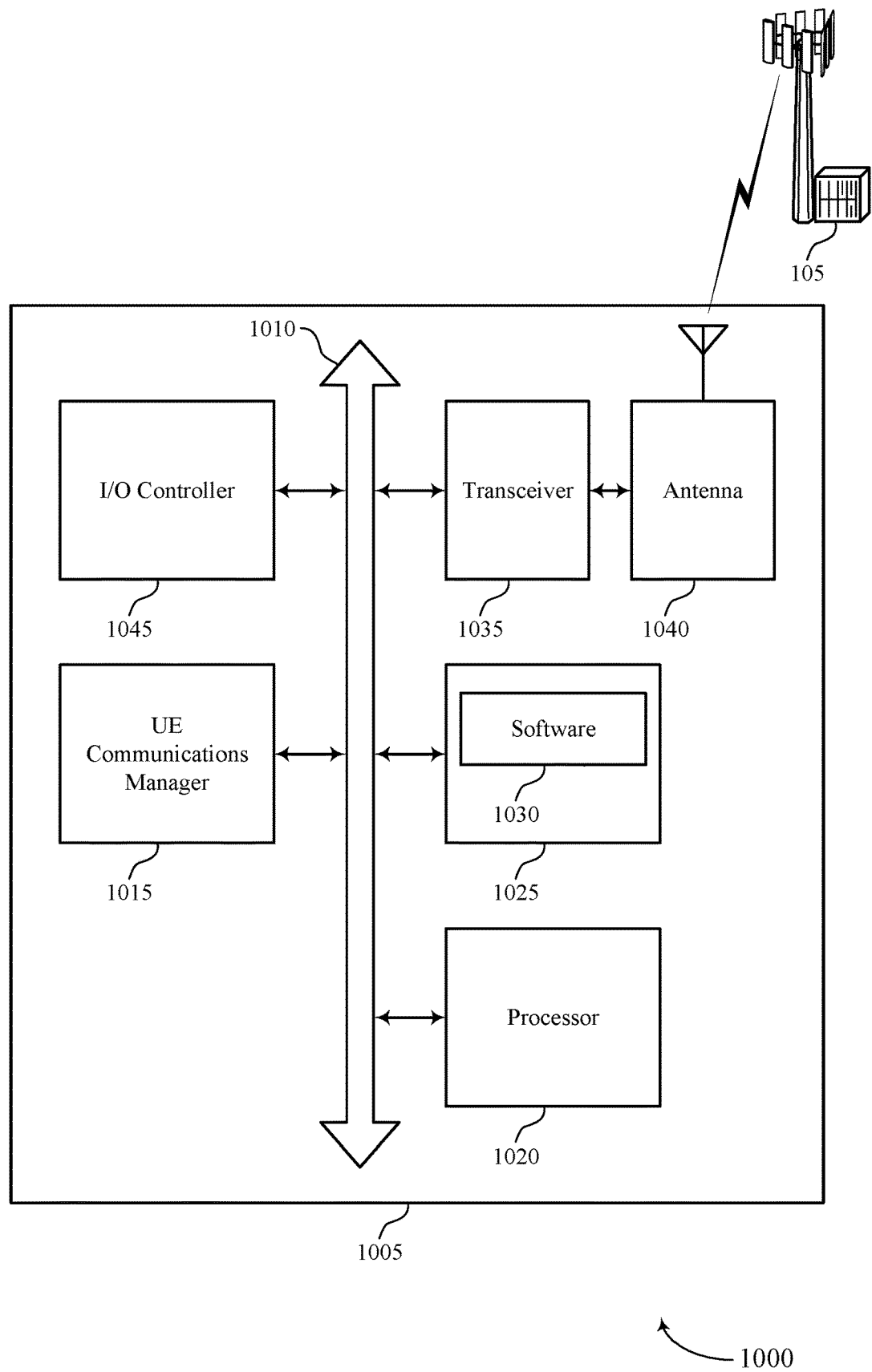
FIG. 10 illustrates a block diagram of a system including a UE that supports downlink transmission in accordance with aspects of the present disclosure.

FIG. 10 shows a diagram of a system 1000 including a device 1005 that supports downlink transmission in accordance with aspects of the present disclosure. Device 1005 may be an example of or include the components of wireless device 705, wireless device 805, or a UE 115 as described herein, e.g., with reference to FIGS. 7 and 8. Device 1005 may include components for bi-directional voice and data communications including components for transmitting and receiving communications, including UE communications manager 1015, processor 1020, memory 1025, software 1030, transceiver 1035, antenna 1040, and I/O controller 1045. These components may be in electronic communication via one or more buses (e.g., bus 1010). Device 1005 may communicate wirelessly with one or more base stations 105.

Processor 1020 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 1020 may be configured to operate a memory array using a memory controller. In other cases, a memory controller may be integrated into processor 1020. Processor 1020 may be configured to execute computer-readable instructions stored in a memory to perform various functions (e.g., functions or tasks supporting grant-free downlink transmission).

Memory 1025 may include random access memory (RAM) and read only memory (ROM). The memory 1025 may store computer-readable, computer-executable software 1030 including instructions that, when executed, cause the processor to perform various functions described herein. In some cases, the memory 1025 may contain, among other things, a basic input/output system (BIOS) which may control basic hardware or software operation such as the interaction with peripheral components or devices.

Software 1030 may include code to implement aspects of the present disclosure, including code to support downlink transmission. Software 1030 may be stored in a non-transitory computer-readable medium such as system memory or other memory. In some cases, the software 1030 may not be directly executable by the processor but may cause a computer (e.g., when compiled and executed) to perform functions described herein.

Transceiver 1035 may communicate bi-directionally, via one or more antennas, wired, or wireless links as described herein. For example, the transceiver 1035 may represent a wireless transceiver and may communicate bi-directionally with another wireless transceiver. The transceiver 1035 may also include a modem to modulate the packets and provide the modulated packets to the antennas for transmission, and to demodulate packets received from the antennas. In some cases, the wireless device may include a single antenna 1040. However, in some cases the device may have more than one antenna 1040, which may be capable of concurrently transmitting or receiving multiple wireless transmissions.

I/O controller 1045 may manage input and output signals for device 1005. I/O controller 1045 may also manage peripherals not integrated into device 1005. In some cases, I/O controller 1045 may represent a physical connection or port to an external peripheral. In some cases, I/O controller 1045 may utilize an operating system such as iOS®, ANDROID®, MS-DOS®, MS-WINDOWS®, OS/2®, UNIX®, LINUX®, or another known operating system. In other cases, I/O controller 1045 may represent or interact with a modem, a keyboard, a mouse, a touchscreen, or a similar device. In some cases, I/O controller 1045 may be implemented as part of a processor. In some cases, a user may interact with device 1005 via I/O controller 1045 or via hardware components controlled by I/O controller 1045.

Figure 11:
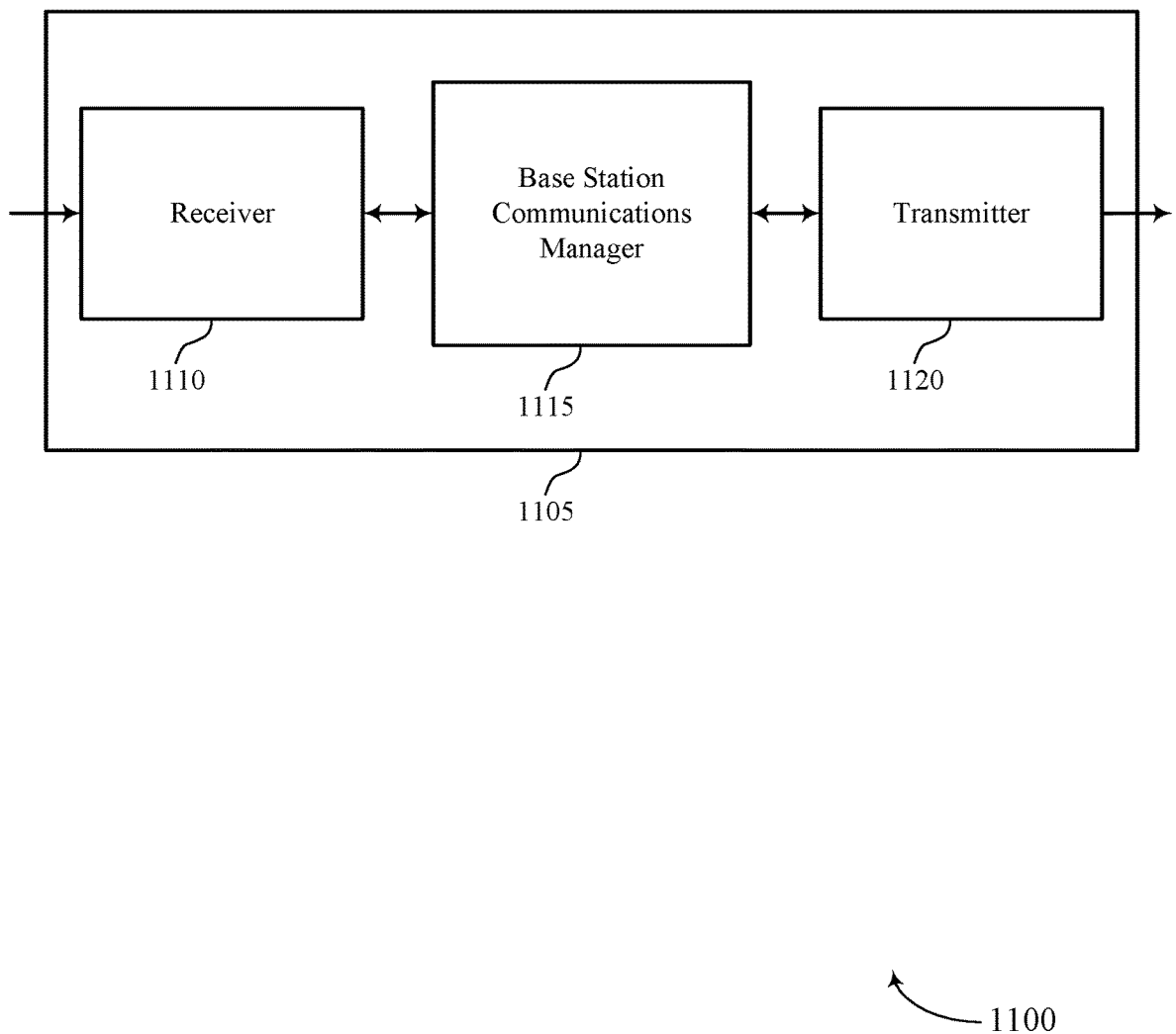
FIGS. 11 and 12 show block diagrams of a device that supports downlink transmission in accordance with aspects of the present disclosure.

FIG. 11 shows a block diagram 1100 of a wireless device 1105 that supports downlink transmission in accordance with aspects of the present disclosure. Wireless device 1105 may be an example of aspects of a base station 105 as described herein. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to grant-free downlink transmission, etc.). Information may be passed on to other components of the device. The receiver 1110 may be an example of aspects of the transceiver 1435 described with reference to FIG. 14. The receiver 1110 may utilize a single antenna or a set of antennas.

Base station communications manager 1115 may be an example of aspects of the base station communications manager 1415 described with reference to FIG. 14. Base station communications manager 1115 and/or at least some of its various sub-components may be implemented in hardware, software executed by a processor, firmware, or any combination thereof. If implemented in software executed by a processor, the functions of the base station communications manager 1115 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure.

The base station communications manager 1115 and/or at least some of its various sub-components may be physically located at various positions, including being distributed such that portions of functions are implemented at different physical locations by one or more physical devices. In some examples, base station communications manager 1115 and/or at least some of its various sub-components may be a separate and distinct component in accordance with various aspects of the present disclosure. In other examples, base station communications manager 1115 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1115 may transmit, to a UE, a resource configuration for transmission of a downlink transmission within a repetition window, the resource configuration including an indicator of a repetition window size for the downlink transmission. Base station communications manager 1115 may transmit the downlink transmission to the UE in accordance with the resource configuration.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1435 described with reference to FIG. 14. The transmitter 1120 may utilize a single antenna or a set of antennas.

Figure 12:
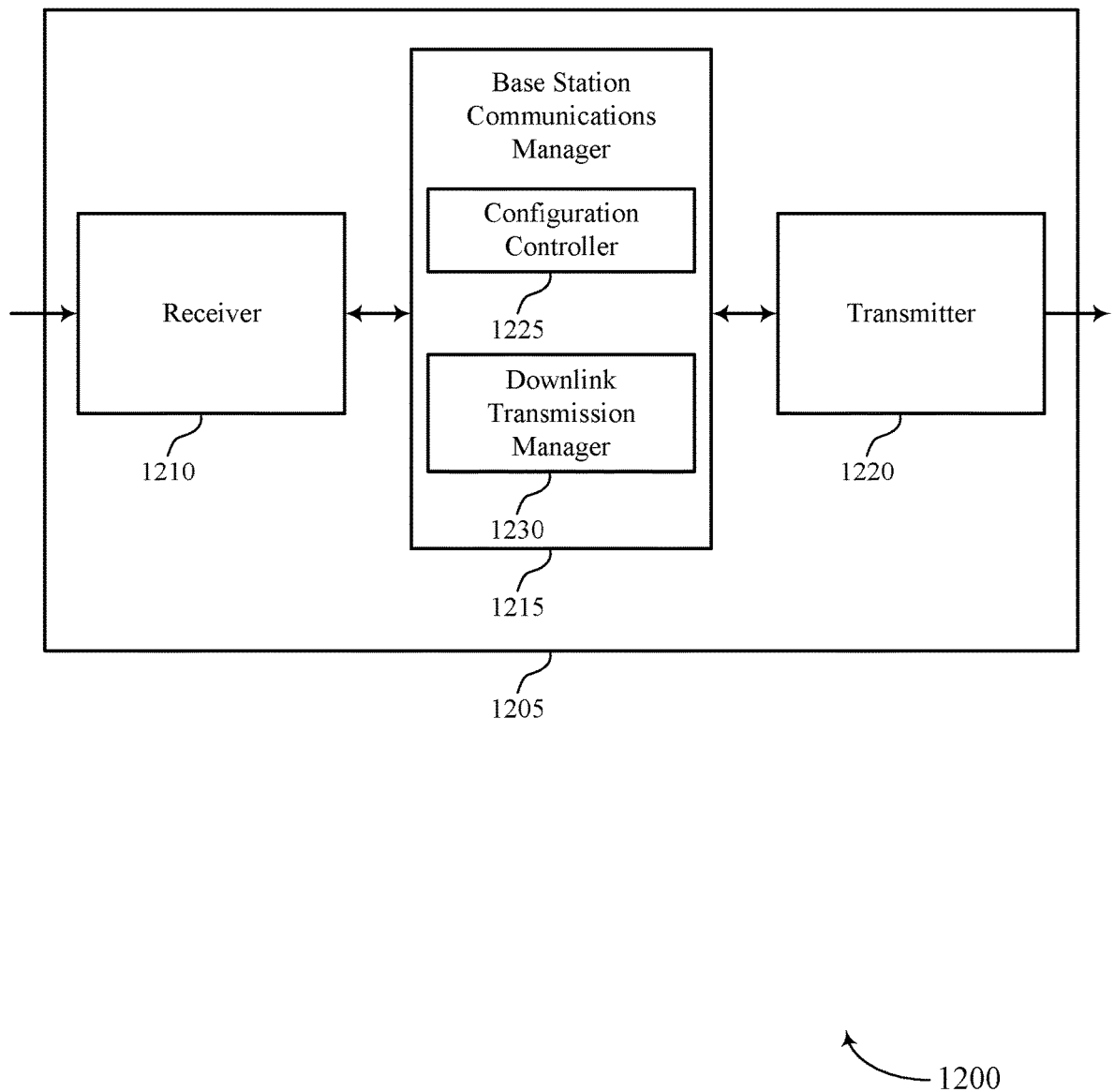

FIG. 12 shows a block diagram 1200 of a wireless device 1205 that supports downlink transmission in accordance with aspects of the present disclosure. Wireless device 1205 may be an example of aspects of a wireless device 1105 or a base station 105 as described with reference to FIG. 11. Wireless device 1205 may include receiver 1210, base station communications manager 1215, and transmitter 1220. Wireless device 1205 may also include a processor. Each of these components may be in communication with one another (e.g., via one or more buses). Base station communications manager 1215 may be an example of aspects of the base station communications manager 1415 described with reference to FIG. 14. Base station communications manager 1215 may also include configuration controller 1225 and downlink transmission manager 1230.

Receiver 1210 may receive information such as packets, user data, or control information associated with various information channels (e.g., control channels, data channels, and information related to grant-free downlink transmission, etc.). Information may be passed on to other components of the device. The receiver 1210 may be an example of aspects of the transceiver 1435 described with reference to FIG. 14. The receiver 1210 may utilize a single antenna or a set of antennas.

Configuration controller 1225 may transmit, to a UE, a resource configuration for transmission of a downlink transmission within a repetition window, the resource configuration including an indicator of a repetition window size for the downlink transmission. In some cases, the resource configuration is transmitted via RRC signaling, the resource configuration further including a series of RV indices for the repetition window.

Downlink transmission manager 1230 may transmit the downlink transmission to the UE in accordance with the resource configuration. For example, downlink transmission manager 1230 may transmit one or more additional repetitions of the downlink transmission during one or more corresponding subsequent TTIs of the repetition window, each of the one or more additional repetitions being associated with a respective RV index. As another example, downlink transmission manager 1230 may transmit the first repetition of the downlink transmission, which may be a grant-free downlink transmission, during a TTI of the subset of TTIs, the first repetition being associated with a first RV index. Downlink transmission manager 1230 may transmit one or more additional repetitions of the grant-free downlink transmission during one or more corresponding subsequent TTIs of the at least one other TTI, each of the one or more additional repetitions being associated with a respective RV index. Downlink transmission manager 1230 may receive, from the UE, an indication of a successful decoding of the downlink transmission.

In some cases, transmitting the downlink transmission to the UE includes transmitting a first repetition of the downlink transmission during an initial TTI of the repetition window, the first repetition being associated with a first RV index. In some cases, transmitting the downlink transmission, which may be a grant-free downlink transmission, to the UE includes identifying a subset of TTIs within the repetition window during which a first repetition of the grant-free downlink transmission is allowed to be transmitted, where the repetition window includes the subset of TTIs and at least one other TTI. In some cases, transmitting the grant-free downlink transmission to the UE includes transmitting a first repetition of the grant-free downlink transmission during any TTI of the repetition window, the first repetition being associated with a first RV index.

Transmitter 1220 may transmit signals generated by other components of the device. In some examples, the transmitter 1220 may be collocated with a receiver 1210 in a transceiver module. For example, the transmitter 1220 may be an example of aspects of the transceiver 1435 described with reference to FIG. 14. The transmitter 1220 may utilize a single antenna or a set of antennas.

Figure 13:
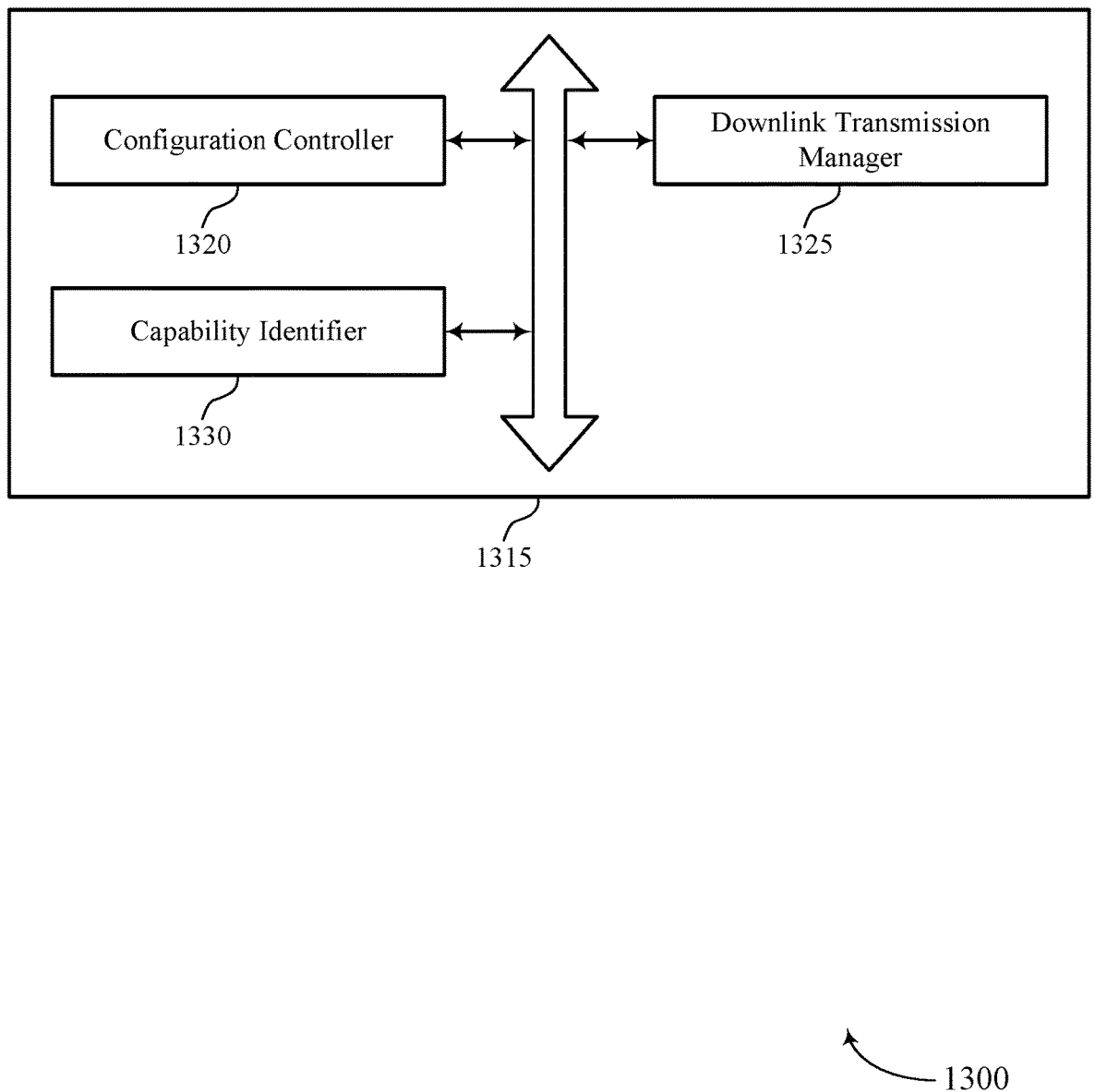
FIG. 13 illustrates a base station communications manager that supports downlink transmission in accordance with aspects of the present disclosure.

FIG. 13 shows a block diagram 1300 of a base station communications manager 1315 that supports downlink transmission in accordance with aspects of the present disclosure. The base station communications manager 1315 may be an example of aspects of a base station communications manager 1415 described with reference to FIGS. 11, 12, and 14. The base station communications manager 1315 may include configuration controller 1320, downlink transmission manager 1325, and capability identifier 1330. Each of these modules may communicate, directly or indirectly, with one another (e.g., via one or more buses).

Configuration controller 1320 may transmit, to a UE, a resource configuration for transmission of a downlink transmission within a repetition window, the resource configuration including an indicator of a repetition window size for the downlink transmission. In some cases, the resource configuration is transmitted via RRC signaling, the resource configuration further including a series of RV indices for the repetition window.

Downlink transmission manager 1325 may transmit the downlink transmission to the UE in accordance with the resource configuration. For example, downlink transmission manager 1325 may transmit one or more additional repetitions of the downlink transmission during one or more corresponding subsequent TTIs of the repetition window, each of the one or more additional repetitions being associated with a respective RV index. As another example, downlink transmission manager 1325 may transmit the first repetition of the downlink transmission, which may be a grant-free downlink transmission, during a TTI of the subset of TTIs, the first repetition being associated with a first RV index. Downlink transmission manager 1325 may transmit one or more additional repetitions of the grant-free downlink transmission during one or more corresponding subsequent TTIs of the at least one other TTI, each of the one or more additional repetitions being associated with a respective RV index. Downlink transmission manager 1325 may receive, from the UE, an indication of a successful decoding of the downlink transmission.

In some cases, transmitting the downlink transmission to the UE includes transmitting a first repetition of the downlink transmission during an initial TTI of the repetition window, the first repetition being associated with a first RV index. In some cases, transmitting the downlink transmission, which may be a grant-free downlink transmission, to the UE includes identifying a subset of TTIs within the repetition window during which a first repetition of the grant-free downlink transmission is allowed to be transmitted, where the repetition window includes the subset of TTIs and at least one other TTI. In some cases, transmitting the downlink transmission to the UE includes transmitting a first repetition of the downlink transmission during any TTI of the repetition window, the first repetition being associated with a first RV index.

Capability identifier 1330 may receive, from the UE, an indication of a capability of the UE, where the capability indicates a maximum repetition window size supported by the UE, a timing within the repetition window for which the UE supports transmission of a first repetition of the grant-free downlink transmission, or combinations of the same.

Figure 14:
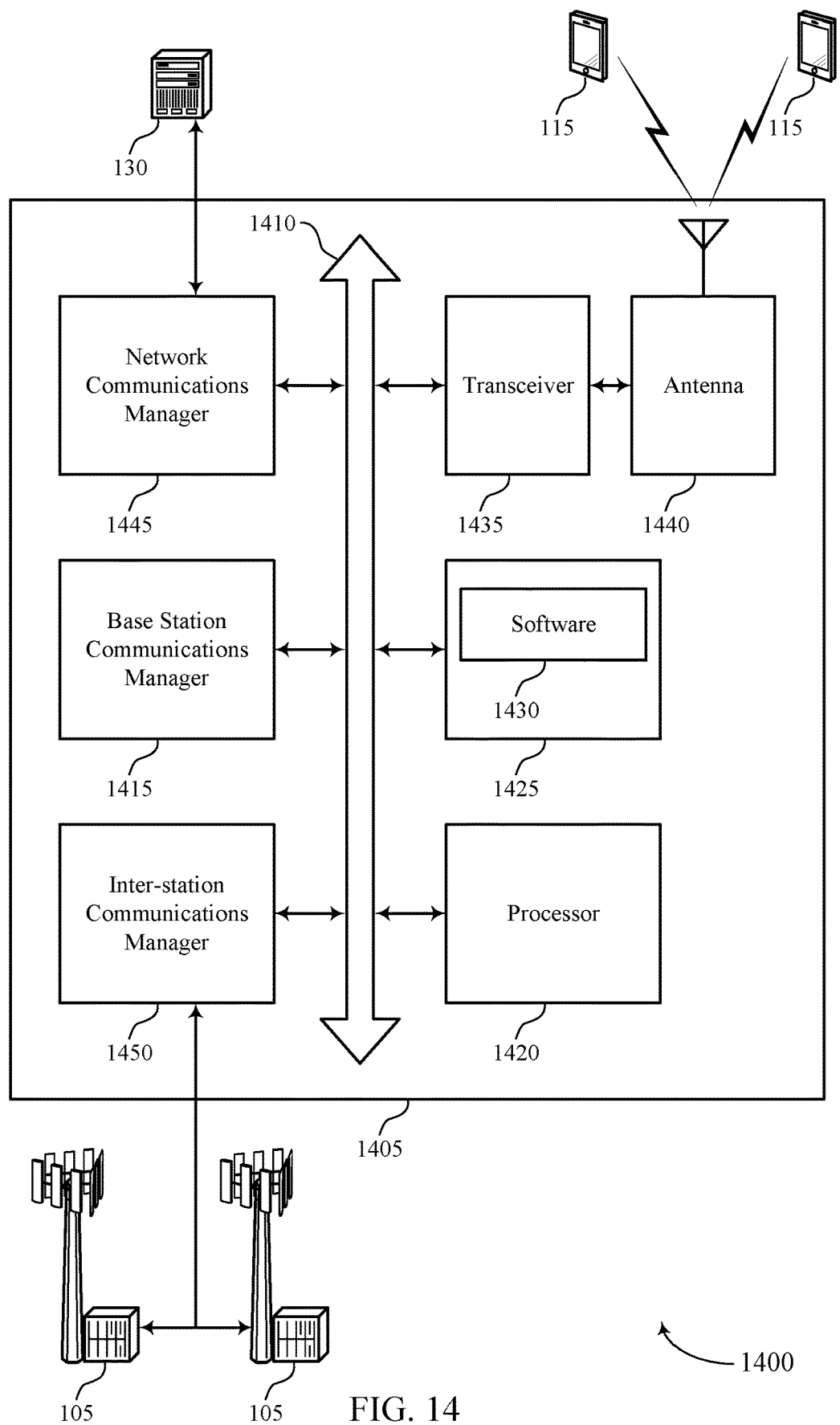
FIG. 14 illustrates a block diagram of a system including a base station that supports downlink transmission in accordance with aspects of the present disclosure.

FIG. 14 shows a diagram of a system 1400 including a device 1405 that supports downlink transmission in accordance with aspects of the present disclosure. Device 1405 may be an example of or include the components of base station 105 as described herein, e.g., with reference to FIG. 1. Device 1405 may include components for bi-directional voice and data communications including components for transmitting and receiving communications, including base station communications manager 1415, processor 1420, memory 1425, software 1430, transceiver 1435, antenna 1440, network communications manager 1445, and inter-station communications manager 1450. These components may be in electronic communication via one or more buses (e.g., bus 1410). Device 1405 may communicate wirelessly with one or more UEs 115.

Processor 1420 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1420 may be configured to operate a memory array using a memory controller. In other cases, a memory controller may be integrated into processor 1420. Processor 1420 may be configured to execute computer-readable instructions stored in a memory to perform various functions (e.g., functions or tasks supporting grant-free downlink transmission).

Memory 1425 may include RAM and ROM. The memory 1425 may store computer-readable, computer-executable software 1430 including instructions that, when executed, cause the processor to perform various functions described herein. In some cases, the memory 1425 may contain, among other things, a BIOS which may control basic hardware or software operation such as the interaction with peripheral components or devices.

Software 1430 may include code to implement aspects of the present disclosure, including code to support grant-free downlink transmission. Software 1430 may be stored in a non-transitory computer-readable medium such as system memory or other memory. In some cases, the software 1430 may not be directly executable by the processor but may cause a computer (e.g., when compiled and executed) to perform functions described herein.

Transceiver 1435 may communicate bi-directionally, via one or more antennas, wired, or wireless links as described herein. For example, the transceiver 1435 may represent a wireless transceiver and may communicate bi-directionally with another wireless transceiver. The transceiver 1435 may also include a modem to modulate the packets and provide the modulated packets to the antennas for transmission, and to demodulate packets received from the antennas. In some cases, the wireless device may include a single antenna 1440. However, in some cases the device may have more than one antenna 1440, which may be capable of concurrently transmitting or receiving multiple wireless transmissions.

Network communications manager 1445 may manage communications with the core network (e.g., via one or more wired backhaul links). For example, the network communications manager 1445 may manage the transfer of data communications for client devices, such as one or more UEs 115.

Inter-station communications manager 1450 may manage communications with other base station 105, and may include a controller or scheduler for controlling communications with UEs 115 in cooperation with other base stations 105. For example, the inter-station communications manager 1450 may coordinate scheduling for transmissions to UEs 115 for various interference mitigation techniques such as beamforming or joint transmission. In some examples, inter-station communications manager 1450 may provide an X2 interface within an Long Term Evolution (LTE)/LTE-A wireless communication network technology to provide communication between base stations 105.

Figure 15:
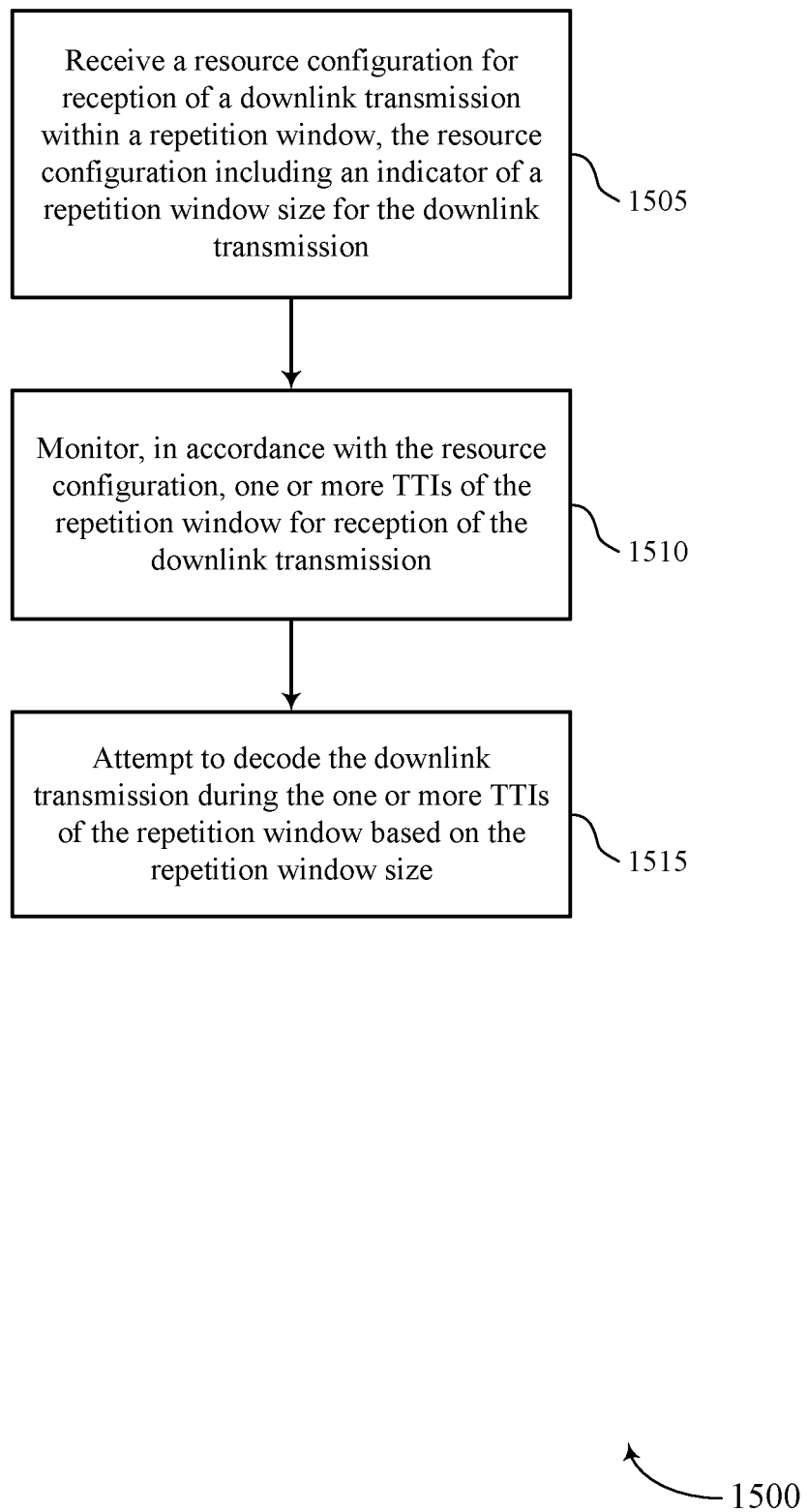
FIGS. 15 through 24 illustrate methods for grant-free downlink transmission in accordance with aspects of the present disclosure.

FIG. 15 shows a flowchart illustrating a method 1500 for downlink transmission in accordance with aspects of the present disclosure. The operations of method 1500 may be implemented by a UE 115 or its components as described herein. For example, the operations of method 1500 may be performed by a UE communications manager as described with reference to FIGS. 7 through 10. In some examples, a UE 115 may execute a set of codes to control the functional elements of the device to perform the functions described herein. Additionally or alternatively, the UE 115 may perform aspects of the functions described herein using special-purpose hardware.

At 1505 the UE 115 may receive a resource configuration for reception of a downlink transmission within a repetition window, the resource configuration including an indicator of a repetition window size for the downlink transmission. The operations of 1505 may be performed according to the methods described herein. In certain examples, aspects of the operations of 1505 may be performed by a configuration manager as described with reference to FIGS. 7 through 10.

At 1510 the UE 115 may monitor, in accordance with the resource configuration, one or more TTIs of the repetition window for reception of the downlink transmission. The operations of 1510 may be performed according to the methods described herein. In certain examples, aspects of the operations of 1510 may be performed by a resource monitoring controller as described with reference to FIGS. 7 through 10.

At 1515 the UE 115 may attempt to decode the downlink transmission during the one or more TTIs of the repetition window based at least in part on the repetition window size. The operations of 1515 may be performed according to the methods described herein. In certain examples, aspects of the operations of 1515 may be performed by a decoding manager as described with reference to FIGS. 7 through 10.

Figure 16:
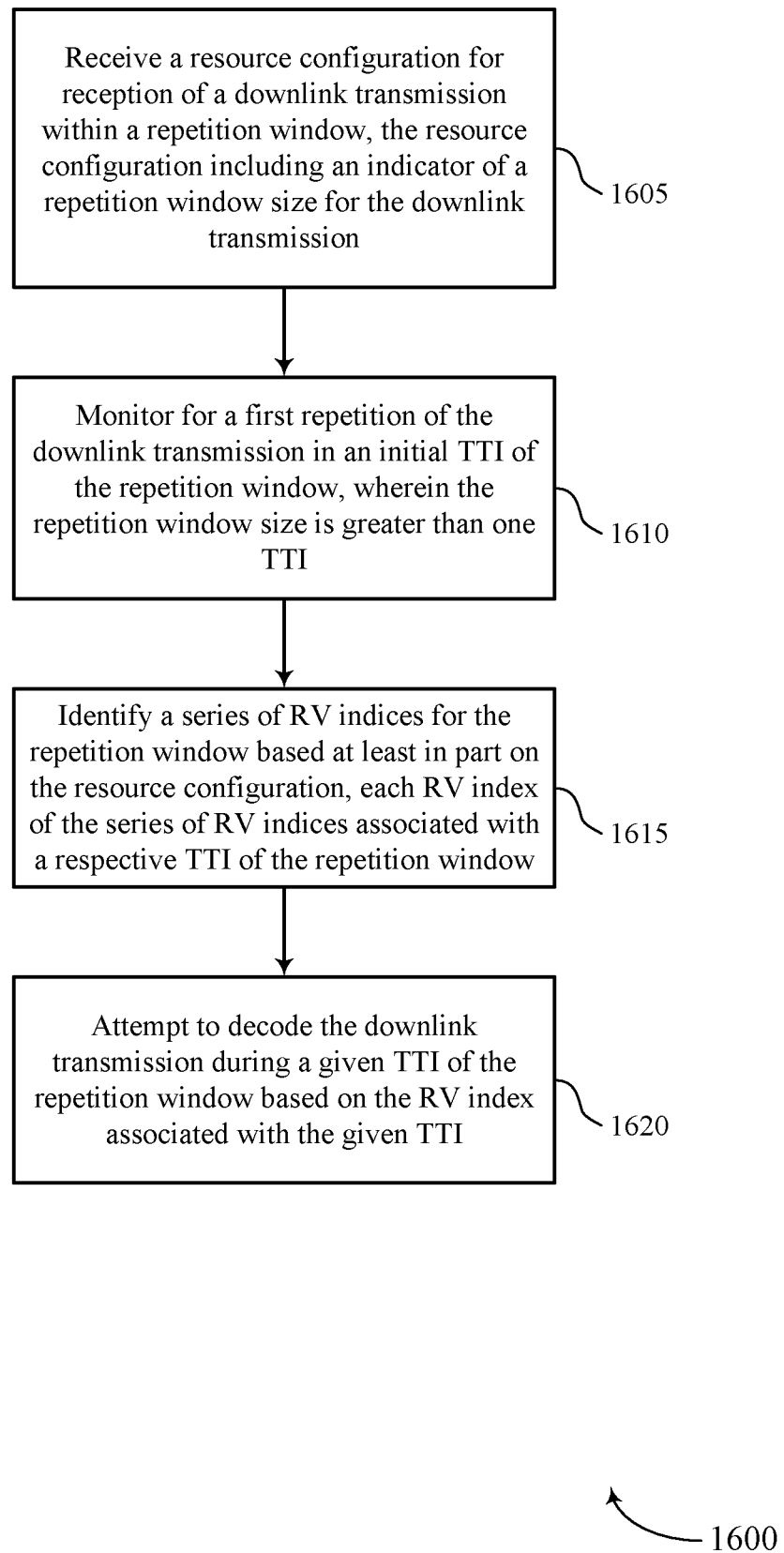

FIG. 16 shows a flowchart illustrating a method 1600 for downlink transmission in accordance with aspects of the present disclosure. The operations of method 1600 may be implemented by a UE 115 or its components as described herein. For example, the operations of method 1600 may be performed by a UE communications manager as described with reference to FIGS. 7 through 10. In some examples, a UE 115 may execute a set of codes to control the functional elements of the device to perform the functions described herein. Additionally or alternatively, the UE 115 may perform aspects of the functions described herein using special-purpose hardware.

At 1605 the UE 115 may receive a resource configuration for reception of a downlink transmission within a repetition window, the resource configuration including an indicator of a repetition window size for the downlink transmission. The operations of 1605 may be performed according to the methods described herein. In certain examples, aspects of the operations of 1605 may be performed by a configuration manager as described with reference to FIGS. 7 through 10.

At 1610 the UE 115 may monitor for a first repetition of the downlink transmission in an initial TTI of the repetition window, where the repetition window size is greater than one TTI. The operations of 1610 may be performed according to the methods described herein. In certain examples, aspects of the operations of 1610 may be performed by a resource monitoring controller as described with reference to FIGS. 7 through 10.

At 1615 the UE 115 may identify a series of RV indices for the repetition window based at least in part on the resource configuration, each RV index of the series of RV indices associated with a respective TTI of the repetition window. The operations of 1615 may be performed according to the methods described herein. In certain examples, aspects of the operations of 1615 may be performed by a decoding manager as described with reference to FIGS. 7 through 10.

At 1620 the UE 115 may attempt to decode the downlink transmission during a given TTI of the repetition window based at least in part on the RV index associated with the given TTI. The operations of 1620 may be performed according to the methods described herein. In certain examples, aspects of the operations of 1620 may be performed by a decoding manager as described with reference to FIGS. 7 through 10.

Figure 17:
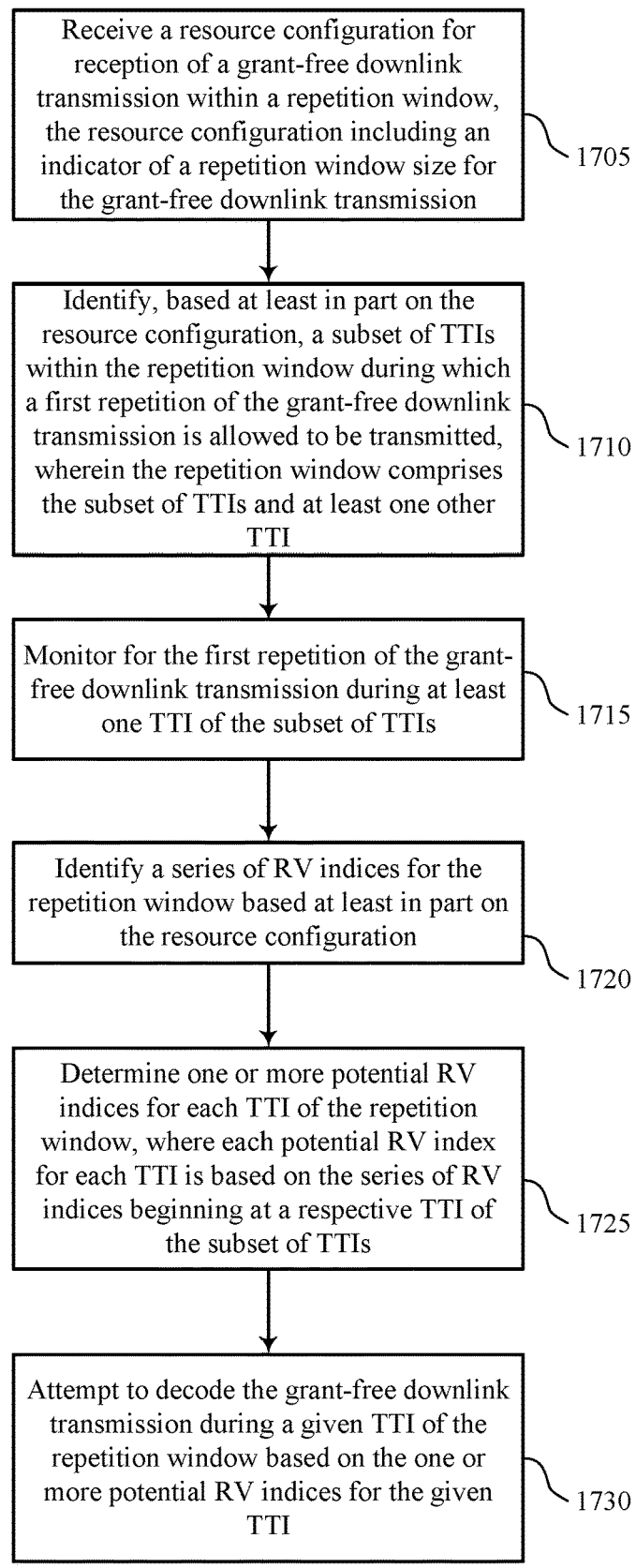

FIG. 17 shows a flowchart illustrating a method 1700 for downlink transmission in accordance with aspects of the present disclosure. The operations of method 1700 may be implemented by a UE 115 or its components as described herein. For example, the operations of method 1700 may be performed by a UE communications manager as described with reference to FIGS. 7 through 10. In some examples, a UE 115 may execute a set of codes to control the functional elements of the device to perform the functions described herein. Additionally or alternatively, the UE 115 may perform aspects of the functions described herein using special-purpose hardware.

At 1705 the UE 115 may receive a resource configuration for reception of a grant-free downlink transmission within a repetition window, the resource configuration including an indicator of a repetition window size for the grant-free downlink transmission. The operations of 1705 may be performed according to the methods described herein. In certain examples, aspects of the operations of 1705 may be performed by a configuration manager as described with reference to FIGS. 7 through 10.

At 1710 the UE 115 may identify, based at least in part on the resource configuration, a subset of TTIs within the repetition window during which a first repetition of the grant-free downlink transmission is allowed to be transmitted, where the repetition window includes the subset of TTIs and at least one other TTI. The operations of 1710 may be performed according to the methods described herein. In certain examples, aspects of the operations of 1710 may be performed by a resource monitoring controller as described with reference to FIGS. 7 through 10.

At 1715 the UE 115 may monitor for the first repetition of the grant-free downlink transmission during at least one TTI of the subset of TTIs. The operations of 1715 may be performed according to the methods described herein. In certain examples, aspects of the operations of 1715 may be performed by a resource monitoring controller as described with reference to FIGS. 7 through 10.

At 1720 the UE 115 may identify a series of RV indices for the repetition window based at least in part on the resource configuration. The operations of 1720 may be performed according to the methods described herein. In certain examples, aspects of the operations of 1720 may be performed by a decoding manager as described with reference to FIGS. 7 through 10.

At 1725 the UE 115 may determine one or more potential RV indices for each TTI of the repetition window, where each potential RV index for each TTI is based at least in part on the series of RV indices beginning at a respective TTI of the subset of TTIs. The operations of 1725 may be performed according to the methods described herein. In certain examples, aspects of the operations of 1725 may be performed by a decoding manager as described with reference to FIGS. 7 through 10.

At 1730 the UE 115 may attempt to decode the grant-free downlink transmission during a given TTI of the repetition window based at least in part on the one or more potential RV indices for the given TTI. The operations of 1730 may be performed according to the methods described herein. In certain examples, aspects of the operations of 1730 may be performed by a decoding manager as described with reference to FIGS. 7 through 10.

Figure 18:
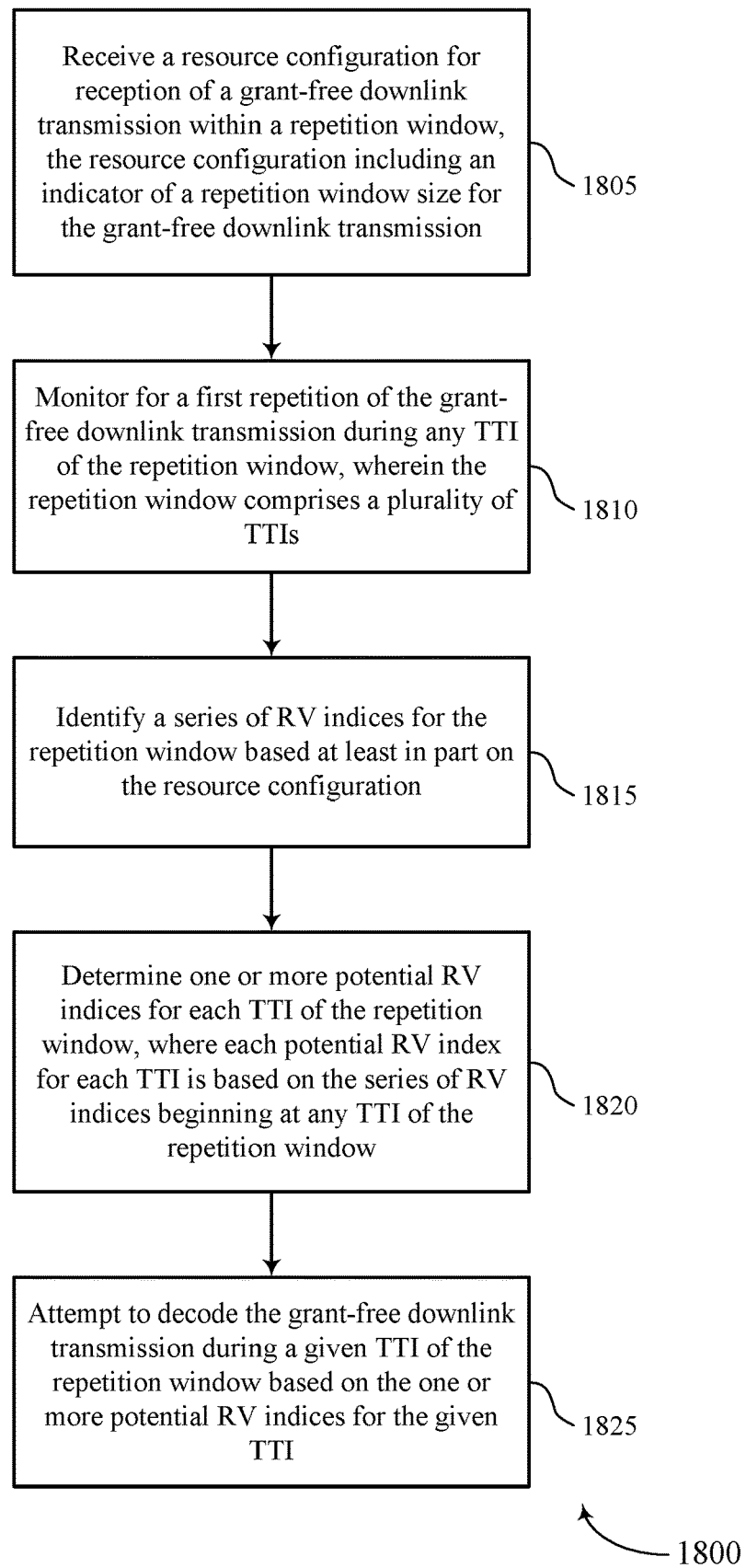

FIG. 18 shows a flowchart illustrating a method 1800 for downlink transmission in accordance with aspects of the present disclosure. The operations of method 1800 may be implemented by a UE 115 or its components as described herein. For example, the operations of method 1800 may be performed by a UE communications manager as described with reference to FIGS. 7 through 10. In some examples, a UE 115 may execute a set of codes to control the functional elements of the device to perform the functions described herein. Additionally or alternatively, the UE 115 may perform aspects of the functions described herein using special-purpose hardware.

At 1805 the UE 115 may receive a resource configuration for reception of a grant-free downlink transmission within a repetition window, the resource configuration including an indicator of a repetition window size for the grant-free downlink transmission. The operations of 1805 may be performed according to the methods described herein. In certain examples, aspects of the operations of 1805 may be performed by a configuration manager as described with reference to FIGS. 7 through 10.

At 1810 the UE 115 may monitor for a first repetition of the grant-free downlink transmission during any TTI of the repetition window, where the repetition window includes a plurality of TTIs. The operations of 1810 may be performed according to the methods described herein. In certain examples, aspects of the operations of 1810 may be performed by a resource monitoring controller as described with reference to FIGS. 7 through 10.

At 1815 the UE 115 may identify a series of RV indices for the repetition window based at least in part on the resource configuration. The operations of 1815 may be performed according to the methods described herein. In certain examples, aspects of the operations of 1815 may be performed by a decoding manager as described with reference to FIGS. 7 through 10.

At 1820 the UE 115 may determine one or more potential RV indices for each TTI of the repetition window, where each potential RV index for each TTI is based at least in part on the series of RV indices beginning at any TTI of the repetition window. The operations of 1820 may be performed according to the methods described herein. In certain examples, aspects of the operations of 1820 may be performed by a decoding manager as described with reference to FIGS. 7 through 10.

At 1825 the UE 115 may attempt to decode the grant-free downlink transmission during a given TTI of the repetition window based at least in part on the one or more potential RV indices for the given TTI. The operations of 1825 may be performed according to the methods described herein. In certain examples, aspects of the operations of 1825 may be performed by a decoding manager as described with reference to FIGS. 7 through 10.

Figure 19:
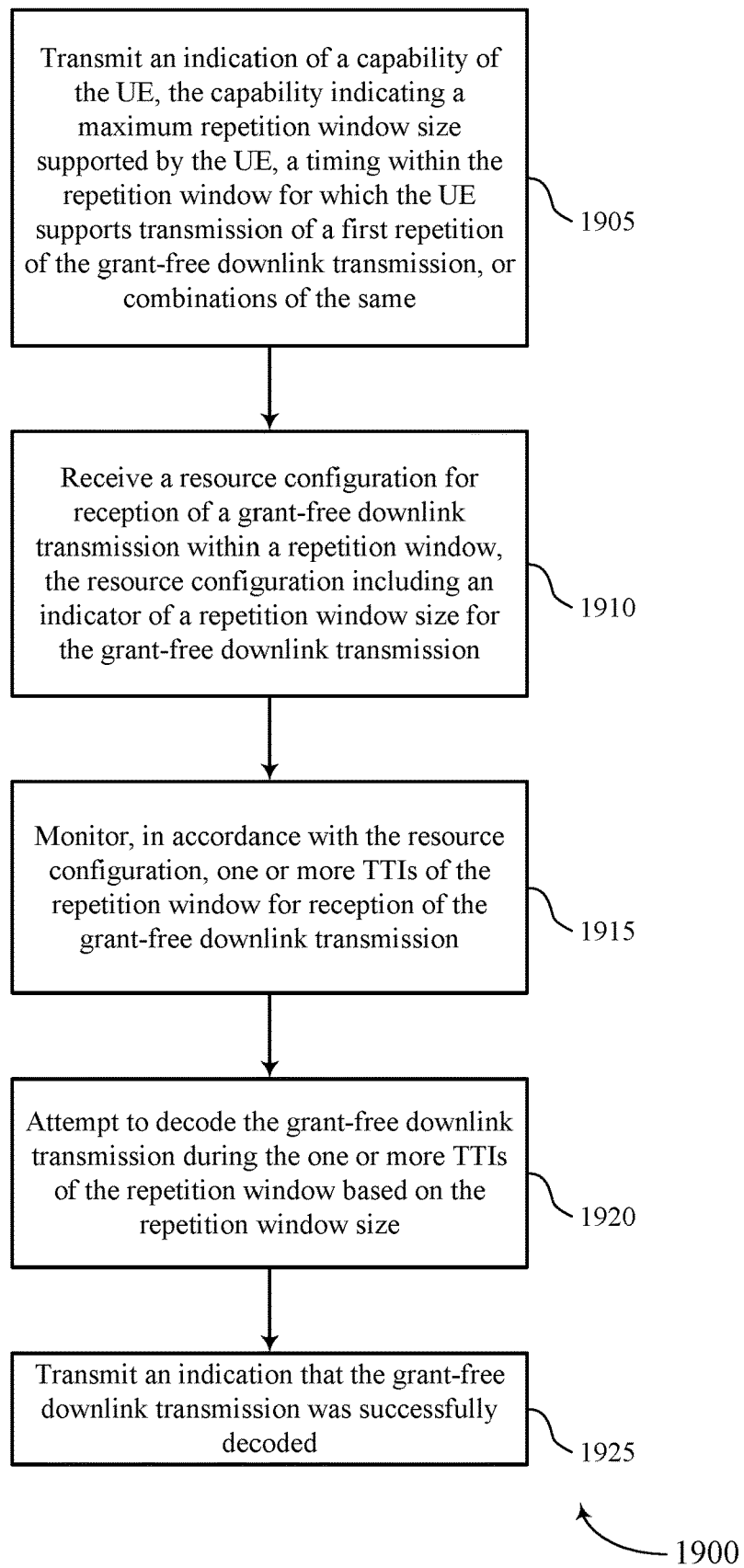

FIG. 19 shows a flowchart illustrating a method 1900 for downlink transmission in accordance with aspects of the present disclosure. The operations of method 1900 may be implemented by a UE 115 or its components as described herein. For example, the operations of method 1900 may be performed by a UE communications manager as described with reference to FIGS. 7 through 10. In some examples, a UE 115 may execute a set of codes to control the functional elements of the device to perform the functions described herein. Additionally or alternatively, the UE 115 may perform aspects of the functions described herein using special-purpose hardware.

At 1905 the UE 115 may transmit an indication of a capability of the UE, the capability indicating a maximum repetition window size supported by the UE, a timing within the repetition window for which the UE supports transmission of a first repetition of the grant-free downlink transmission, or combinations of the same. The operations of 1905 may be performed according to the methods described herein. In certain examples, aspects of the operations of 1905 may be performed by a capability manager as described with reference to FIGS. 7 through 10.

At 1910 the UE 115 may receive a resource configuration for reception of a grant-free downlink transmission within a repetition window, the resource configuration including an indicator of a repetition window size for the grant-free downlink transmission. The operations of 1910 may be performed according to the methods described herein. In certain examples, aspects of the operations of 1910 may be performed by a configuration manager as described with reference to FIGS. 7 through 10.

At 1915 the UE 115 may monitor, in accordance with the resource configuration, one or more TTIs of the repetition window for reception of the grant-free downlink transmission. The operations of 1915 may be performed according to the methods described herein. In certain examples, aspects of the operations of 1915 may be performed by a resource monitoring controller as described with reference to FIGS. 7 through 10.

At 1920 the UE 115 may attempt to decode the grant-free downlink transmission during the one or more TTIs of the repetition window based at least in part on the repetition window size. The operations of 1920 may be performed according to the methods described herein. In certain examples, aspects of the operations of 1920 may be performed by a decoding manager as described with reference to FIGS. 7 through 10.

At 1925 the UE 115 may transmit an indication that the grant-free downlink transmission was successfully decoded. The operations of 1925 may be performed according to the methods described herein. In certain examples, aspects of the operations of 1925 may be performed by a decoding manager as described with reference to FIGS. 7 through 10.

Figure 20:
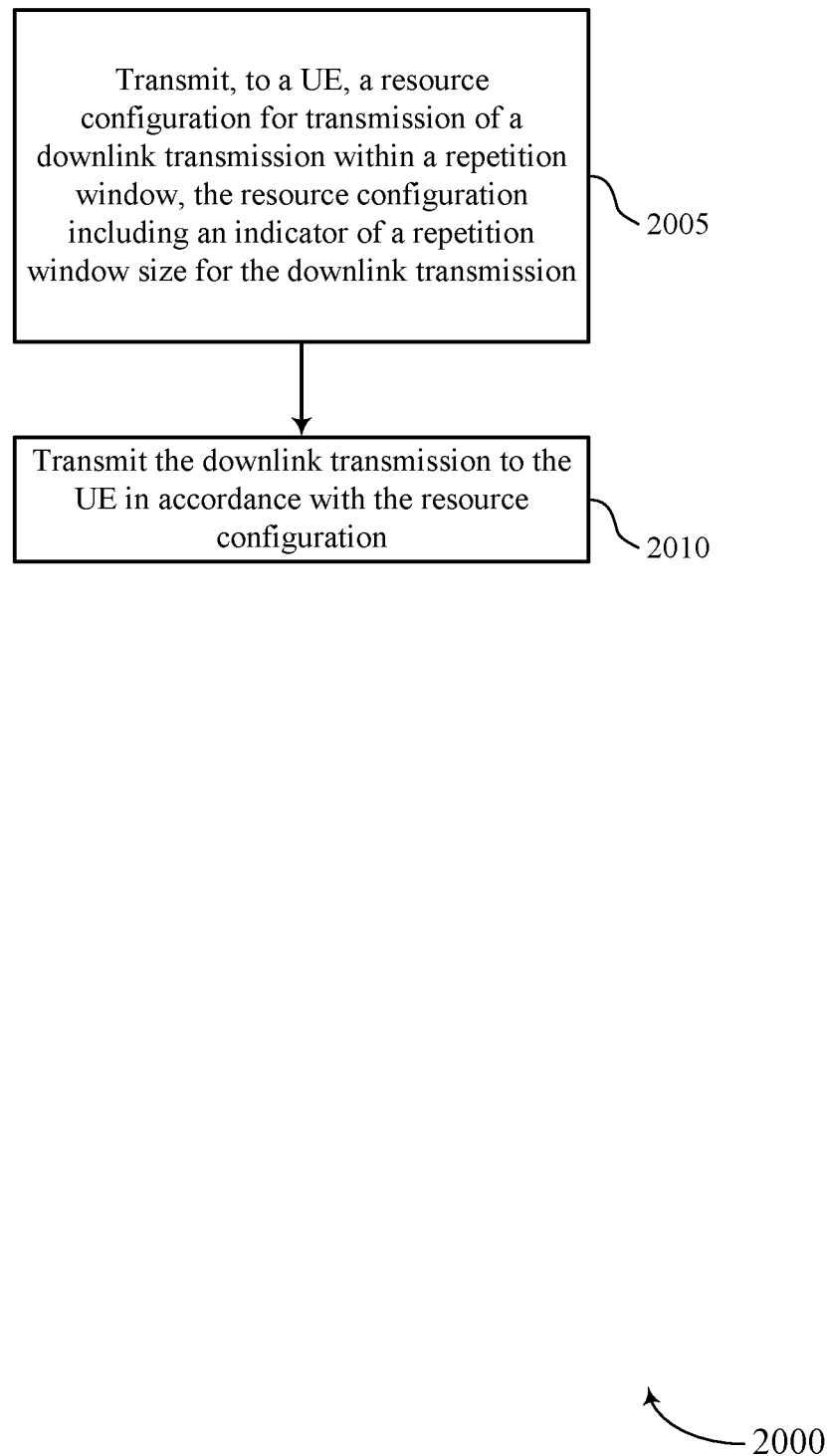

FIG. 20 shows a flowchart illustrating a method 2000 for downlink transmission in accordance with aspects of the present disclosure. The operations of method 2000 may be implemented by a base station 105 or its components as described herein. For example, the operations of method 2000 may be performed by a base station communications manager as described with reference to FIGS. 11 through 14. In some examples, a base station 105 may execute a set of codes to control the functional elements of the device to perform the functions described herein. Additionally or alternatively, the base station 105 may perform aspects of the functions described herein using special-purpose hardware.

At 2005 the base station 105 may transmit, to a UE, a resource configuration for transmission of a downlink transmission within a repetition window, the resource configuration including an indicator of a repetition window size for the downlink transmission. The operations of 2005 may be performed according to the methods described herein. In certain examples, aspects of the operations of 2005 may be performed by a configuration controller as described with reference to FIGS. 11 through 14.

At 2010 the base station 105 may transmit the downlink transmission to the UE in accordance with the resource configuration. The operations of 2010 may be performed according to the methods described herein. In certain examples, aspects of the operations of 2010 may be performed by a downlink transmission manager as described with reference to FIGS. 11 through 14.

Figure 21:
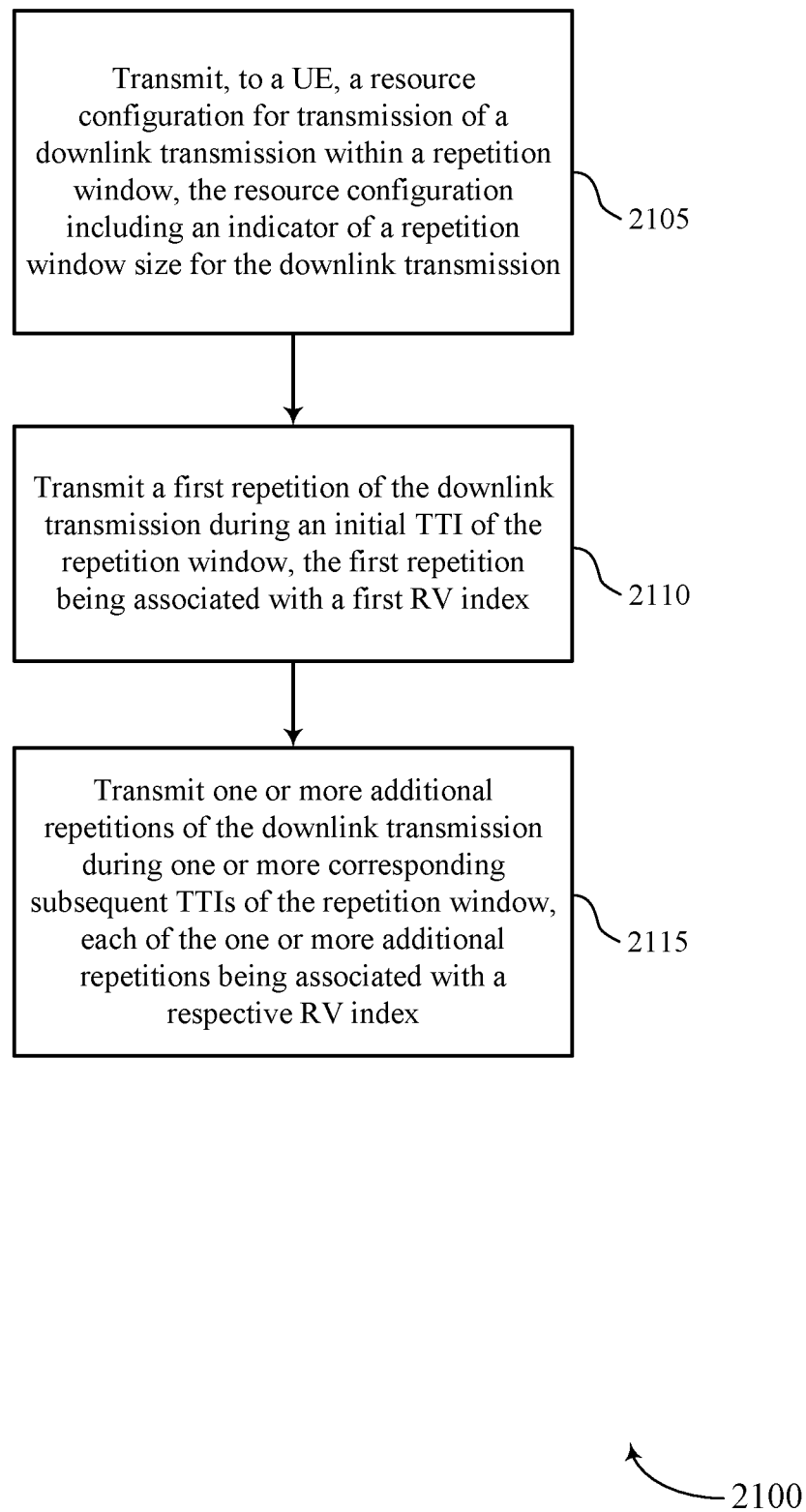

FIG. 21 shows a flowchart illustrating a method 2100 for downlink transmission in accordance with aspects of the present disclosure. The operations of method 2100 may be implemented by a base station 105 or its components as described herein. For example, the operations of method 2100 may be performed by a base station communications manager as described with reference to FIGS. 11 through 14.

In some examples, a base station 105 may execute a set of codes to control the functional elements of the device to perform the functions described herein. Additionally or alternatively, the base station 105 may perform aspects of the functions described herein using special-purpose hardware.

At 2105 the base station 105 may transmit, to a UE, a resource configuration for transmission of a downlink transmission within a repetition window, the resource configuration including an indicator of a repetition window size for the downlink transmission. The operations of 2105 may be performed according to the methods described herein. In certain examples, aspects of the operations of 2105 may be performed by a configuration controller as described with reference to FIGS. 11 through 14.

At 2110 the base station 105 may transmit a first repetition of the downlink transmission during an initial TTI of the repetition window, the first repetition being associated with a first RV index. The operations of 2110 may be performed according to the methods described herein. In certain examples, aspects of the operations of 2110 may be performed by a downlink transmission manager as described with reference to FIGS. 11 through 14.

At 2115 the base station 105 may transmit one or more additional repetitions of the downlink transmission during one or more corresponding subsequent TTIs of the repetition window, each of the one or more additional repetitions being associated with a respective RV index. The operations of 2115 may be performed according to the methods described herein. In certain examples, aspects of the operations of 2115 may be performed by a downlink transmission manager as described with reference to FIGS. 11 through 14.

Figure 22:
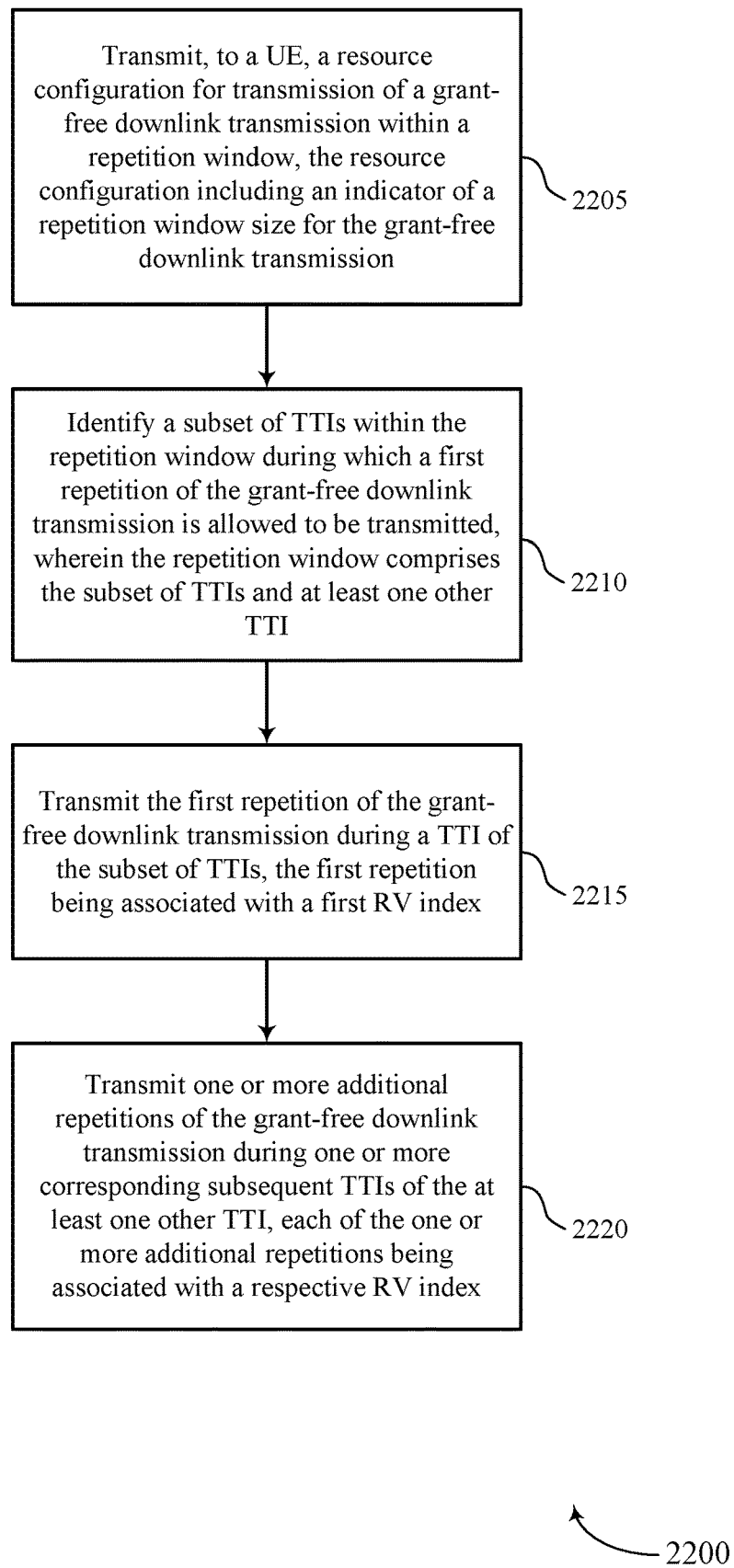

FIG. 22 shows a flowchart illustrating a method 2200 for downlink transmission in accordance with aspects of the present disclosure. The operations of method 2200 may be implemented by a base station 105 or its components as described herein. For example, the operations of method 2200 may be performed by a base station communications manager as described with reference to FIGS. 11 through 14. In some examples, a base station 105 may execute a set of codes to control the functional elements of the device to perform the functions described herein. Additionally or alternatively, the base station 105 may perform aspects of the functions described herein using special-purpose hardware.

At 2205 the base station 105 may transmit, to a UE, a resource configuration for transmission of a grant-free downlink transmission within a repetition window, the resource configuration including an indicator of a repetition window size for the grant-free downlink transmission. The operations of 2205 may be performed according to the methods described herein. In certain examples, aspects of the operations of 2205 may be performed by a configuration controller as described with reference to FIGS. 11 through 14.

At 2210 the base station 105 may identify a subset of TTIs within the repetition window during which a first repetition of the grant-free downlink transmission is allowed to be transmitted, where the repetition window includes the subset of TTIs and at least one other TTI. The operations of 2210 may be performed according to the methods described herein. In certain examples, aspects of the operations of 2210 may be performed by a downlink transmission manager as described with reference to FIGS. 11 through 14.

At 2215 the base station 105 may transmit the first repetition of the grant-free downlink transmission during a TTI of the subset of TTIs, the first repetition being associated with a first RV index. The operations of 2215 may be performed according to the methods described herein. In certain examples, aspects of the operations of 2215 may be performed by a downlink transmission manager as described with reference to FIGS. 11 through 14.

At 2220 the base station 105 may transmit one or more additional repetitions of the grant-free downlink transmission during one or more corresponding subsequent TTIs of the at least one other TTI, each of the one or more additional repetitions being associated with a respective RV index. The operations of 2220 may be performed according to the methods described herein. In certain examples, aspects of the operations of 2220 may be performed by a downlink transmission manager as described with reference to FIGS. 11 through 14.

Figure 23:
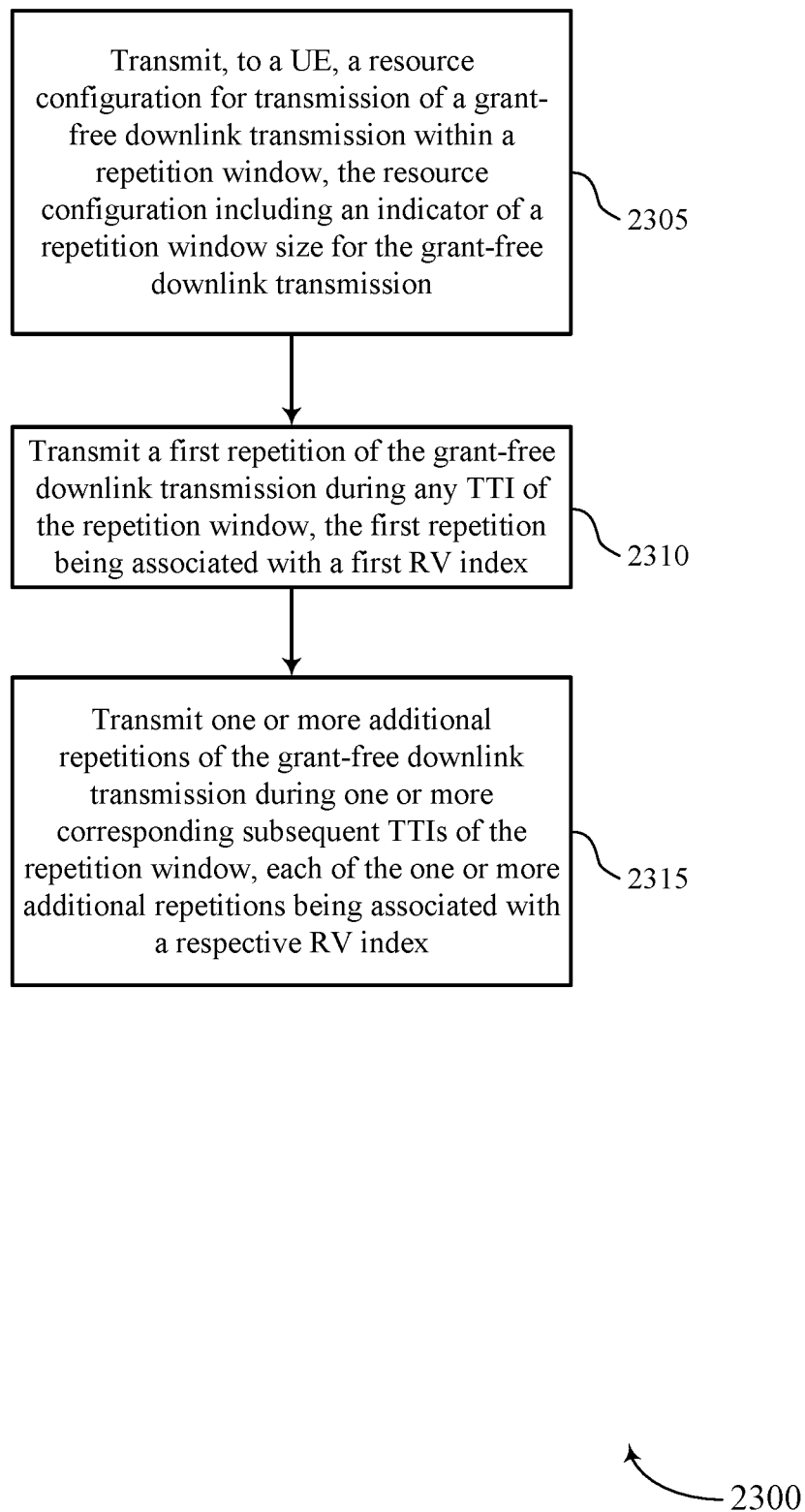

FIG. 23 shows a flowchart illustrating a method 2300 for downlink transmission in accordance with aspects of the present disclosure. The operations of method 2300 may be implemented by a base station 105 or its components as described herein. For example, the operations of method 2300 may be performed by a base station communications manager as described with reference to FIGS. 11 through 14. In some examples, a base station 105 may execute a set of codes to control the functional elements of the device to perform the functions described herein. Additionally or alternatively, the base station 105 may perform aspects of the functions described herein using special-purpose hardware.

At 2305 the base station 105 may transmit, to a user equipment (UE), a resource configuration for transmission of a grant-free downlink transmission within a repetition window, the resource configuration including an indicator of a repetition window size for the grant-free downlink transmission. The operations of 2305 may be performed according to the methods described herein. In certain examples, aspects of the operations of 2305 may be performed by a configuration controller as described with reference to FIGS. 11 through 14.

At 2310 the base station 105 may transmit a first repetition of the grant-free downlink transmission during any TTI of the repetition window, the first repetition being associated with a first RV index. The operations of 2310 may be performed according to the methods described herein. In certain examples, aspects of the operations of 2310 may be performed by a downlink transmission manager as described with reference to FIGS. 11 through 14.

At 2315 the base station 105 may transmit one or more additional repetitions of the grant-free downlink transmission during one or more corresponding subsequent TTIs of the repetition window, each of the one or more additional repetitions being associated with a respective RV index. The operations of 2315 may be performed according to the methods described herein. In certain examples, aspects of the operations of 2315 may be performed by a downlink transmission manager as described with reference to FIGS. 11 through 14.

Figure 24:
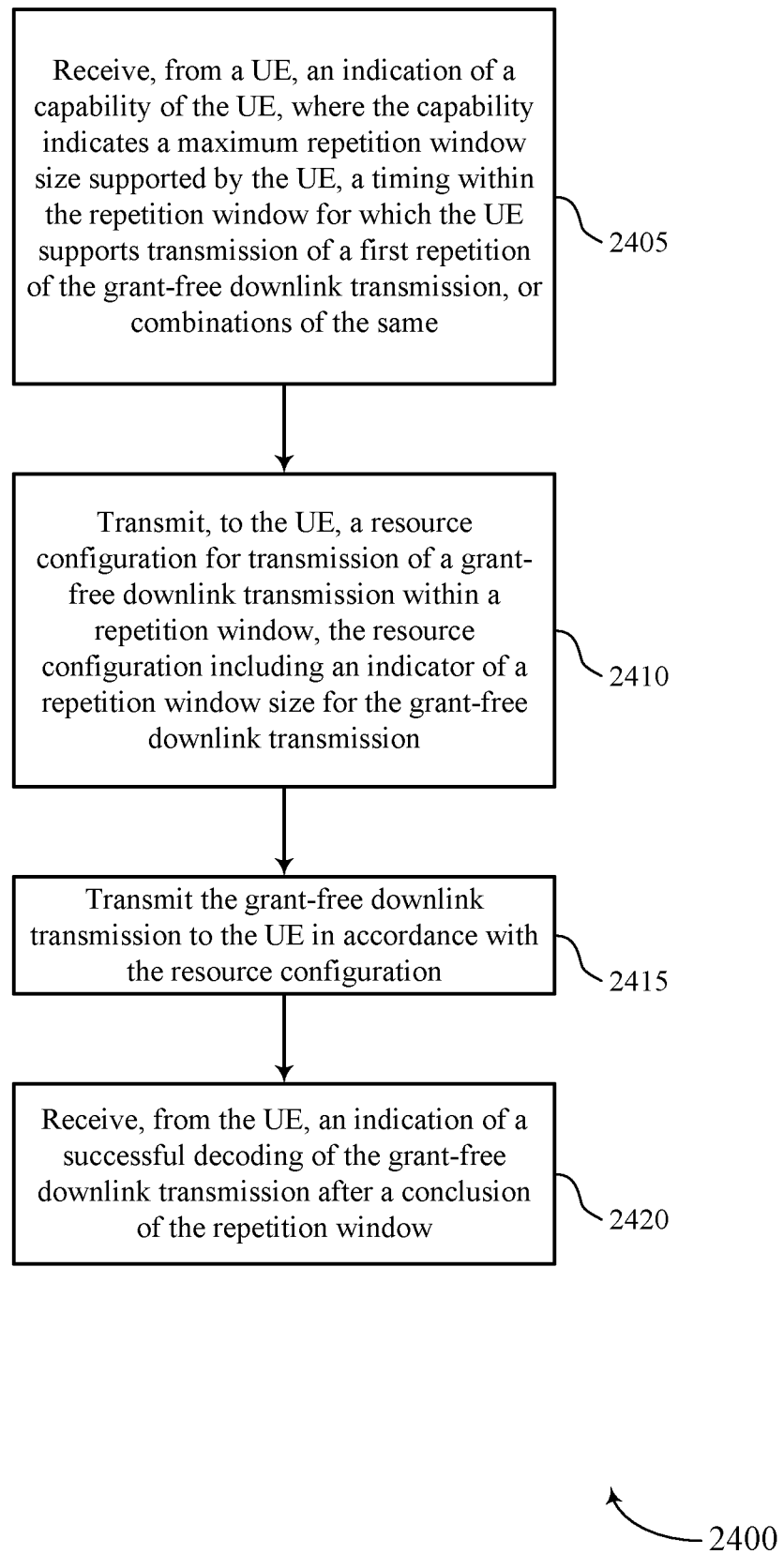

FIG. 24 shows a flowchart illustrating a method 2400 for downlink transmission in accordance with aspects of the present disclosure. The operations of method 2400 may be implemented by a base station 105 or its components as described herein. For example, the operations of method 2400 may be performed by a base station communications manager as described with reference to FIGS. 11 through 14. In some examples, a base station 105 may execute a set of codes to control the functional elements of the device to perform the functions described herein. Additionally or alternatively, the base station 105 may perform aspects of the functions described herein using special-purpose hardware.

At 2405 the base station 105 may receive, from a UE, an indication of a capability of the UE, where the capability indicates a maximum repetition window size supported by the UE, a timing within the repetition window for which the UE supports transmission of a first repetition of the grant-free downlink transmission, or combinations of the same. The operations of 2405 may be performed according to the methods described herein. In certain examples, aspects of the operations of 2405 may be performed by a capability identifier as described with reference to FIGS. 11 through 14.

At 2410 the base station 105 may transmit, to the UE, a resource configuration for transmission of a grant-free downlink transmission within a repetition window, the resource configuration including an indicator of a repetition window size for the grant-free downlink transmission. The operations of 2410 may be performed according to the methods described herein. In certain examples, aspects of the operations of 2410 may be performed by a configuration controller as described with reference to FIGS. 11 through 14.

At 2415 the base station 105 may transmit the grant-free downlink transmission to the UE in accordance with the resource configuration. The operations of 2415 may be performed according to the methods described herein. In certain examples, aspects of the operations of 2415 may be performed by a downlink transmission manager as described with reference to FIGS. 11 through 14.

At 2420 the base station 105 may receive, from the UE, an indication of a successful decoding of the grant-free downlink transmission. The operations of 2420 may be performed according to the methods described herein. In certain examples, aspects of the operations of 2420 may be performed by a downlink transmission manager as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    receiving a resource configuration for reception of a downlink transmission within a repetition window, the resource configuration including an indicator of a repetition window size for the downlink transmission;
    monitoring, in accordance with the resource configuration, one or more transmission occasions of the repetition window for reception of the downlink transmission;
    identifying a series of redundancy version (RV) indices for the repetition window based at least in part on the resource configuration;
    determining one or more potential RV indices for each transmission occasion of the repetition window, wherein each potential RV index for each transmission occasion is based at least in part on the series of RV indices beginning at any transmission occasion of the repetition window; and
    decoding the downlink transmission during the one or more transmission occasions of the repetition window based at least in part on the repetition window size and the one or more potential RV indices for each transmission occasion.

2. The method of claim 1, wherein the downlink transmission is a grant-free downlink transmission and wherein monitoring the one or more transmission occasions of the repetition window for reception of the grant-free downlink transmission comprises:
    monitoring for a first repetition of the grant-free downlink transmission during any transmission occasion of the repetition window, wherein the repetition window comprises a plurality of transmission occasions.

3. The method of claim 2, further comprising:
    determining that a first decoding hypothesis corresponding to decoding the first repetition of the grant-free downlink transmission during a given transmission occasion of the repetition window has failed; and
    decoding a second repetition of the grant-free downlink transmission using a second decoding hypothesis during the given transmission occasion of the repetition window based at least in part on the determination that the first decoding hypothesis has failed.

4. The method of claim 3, further comprising:
decoding the first repetition of the grant-free downlink transmission using an additional decoding hypothesis during a subsequent transmission occasion of the repetition window based at least in part on the determination that the first decoding hypothesis has failed.

5. The method of claim 2, further comprising:
transmitting an indication of a capability of the UE, the capability indicating a maximum repetition window size supported by the UE, a timing within the repetition window for which the UE supports transmission of the first repetition of the grant-free downlink transmission, or combinations of the same.

6. The method of claim 2, wherein decoding the grant-free downlink transmission comprises:
identifying a hybrid automatic repeat request (HARQ) process identification (ID) for each transmission occasion of the repetition window, wherein the HARQ process ID for each transmission occasion is based at least in part on the series of RV indices beginning at any transmission occasion of the repetition window; and
combining logarithmic likelihood ratios (LLRs) of the grant-free downlink transmission for a given transmission occasion with a previously received signal based at least in part on the HARQ process ID.

7. The method of claim 2, wherein decoding the grant-free downlink transmission comprises:
identifying a potential RV index and a corresponding hybrid automatic repeat request (HARQ) process identification (ID) for the grant-free downlink transmission, wherein each decoding is based on a unique pair of potential RV index and corresponding HARQ process ID.

8. The method of claim 7, wherein identifying the potential RV index and the corresponding HARQ process ID for the grant-free downlink transmission comprises:
determining a transmission occasion index for each of the one or more transmission occasions of the repetition window, wherein the corresponding HARQ process ID for a given transmission occasion is based at least in part on the transmission occasion index for the given transmission occasion.

9. The method of claim 2, wherein monitoring the one or more transmission occasions of the repetition window for reception of the grant-free downlink transmission comprises:
identifying, based at least in part on the resource configuration, a subset of transmission occasions within the repetition window during which the first repetition of the grant-free downlink transmission is allowed to be transmitted, wherein the repetition window comprises the subset of transmission occasions and at least one other transmission occasion; and
monitoring for the first repetition of the grant-free downlink transmission during at least one transmission occasion of the subset of transmission occasions.

10. The method of claim 9, wherein an RV index of the first repetition of the grant-free downlink transmission is zero (0).

11. The method of claim 9, wherein each potential RV index for each transmission occasion is based at least in part on the series of RV indices beginning at a respective transmission occasion of the subset of transmission occasions.

12. The method of claim 9, wherein decoding the grant-free downlink transmission comprises:
identifying a hybrid automatic repeat request (HARQ) process identification (ID) for each transmission occasion of the repetition window, wherein the HARQ process ID for each transmission occasion is based at least in part on the series of RV indices beginning at a respective transmission occasion of the subset of transmission occasions; and
combining logarithmic likelihood ratios (LLRs) of the grant-free downlink transmission for a given transmission occasion with a previously received signal based at least in part on the HARQ process ID.

13. The method of claim 9, further comprising:
failing to decode the first repetition of the grant-free downlink transmission during an initial transmission occasion of the subset of transmission occasions; and
decoding the first repetition of the grant-free downlink transmission during an immediately subsequent transmission occasion of the subset of transmission occasions based at least in part on failing to decode the first repetition during the initial transmission occasion of the subset of transmission occasions.

14. The method of claim 1, wherein monitoring the one or more transmission occasions of the repetition window for reception of the downlink transmission comprises:
monitoring for a first repetition of the downlink transmission in an initial transmission occasion of the repetition window, wherein the repetition window size is greater than one transmission occasion.

15. The method of claim 14, wherein each RV index of the series of RV indices is associated with a respective transmission occasion of the repetition window; and
decoding the downlink transmission comprises decoding the downlink transmission during a given transmission occasion of the repetition window based at least in part on the RV index associated with the given transmission occasion.

16. The method of claim 1, wherein the resource configuration is received via radio resource control (RRC) signaling, the resource configuration further comprising a series of RV indices for repeated transmissions of the downlink transmission within the repetition window.

17. The method of claim 1, wherein decoding the downlink transmission comprises successfully decoding the downlink transmission, the method further comprising:
transmitting an indication that the downlink transmission was successfully decoded.

18. An apparatus for wireless communication at a user equipment (UE), comprising:
a processor,
memory in electronic communication with the processor; and
instructions stored in the memory and executable by the processor to cause the apparatus to:
receive a resource configuration for reception of a downlink transmission within a repetition window, the resource configuration including an indicator of a repetition window size for the downlink transmission;
monitor, in accordance with the resource configuration, one or more transmission occasions of the repetition window for reception of the downlink transmission;
identify a series of redundancy version (RV) indices for the repetition window based at least in part on the resource configuration;
determine one or more potential RV indices for each transmission occasion of the repetition window, wherein each potential RV index for each transmission occasion is based at least in part on the series of RV indices beginning at any transmission occasion of the repetition window; and decode the downlink transmission during the one or more transmission occasions of the repetition window based at least in part on the repetition window size and the one or more potential RV indices for each transmission occasion.

19. The apparatus of claim 18, wherein the downlink transmission is a grant-free downlink transmission and wherein the instructions to monitor the one or more transmission occasions of the repetition window for reception of the grant-free downlink transmission are executable by the processor to cause the apparatus to:

monitor for a first repetition of the grant-free downlink transmission during any transmission occasion of the repetition window, wherein the repetition window comprises a plurality of transmission occasions.

20. The apparatus of claim 19, wherein the instructions to decode the grant-free downlink transmission are executable by the processor to cause the apparatus to:

identify a hybrid automatic repeat request (HARQ) process identification (ID) for each transmission occasion of the repetition window, wherein the HARQ process ID for each transmission occasion is based at least in part on the series of RV indices beginning at any transmission occasion of the repetition window; and combine logarithmic likelihood ratios (LLRs) of the grant-free downlink transmission for a given transmission occasion with a previously received signal based at least in part on the HARQ process ID.

21. The apparatus of claim 19, wherein the instructions to decode the grant-free downlink transmission are executable by the processor to cause the apparatus to:

identify a potential RV index and a corresponding hybrid automatic repeat request (HARQ) process identification (ID) for the grant-free downlink transmission, wherein each decoding is based on a unique pair of potential RV index and corresponding HARQ process ID.

22. The apparatus of claim 21, wherein the instructions to identify the potential RV index and the corresponding HARQ process ID for the grant-free downlink transmission are executable by the processor to cause the apparatus to:

determine a transmission occasion index for each of the one or more transmission occasions of the repetition window, wherein the corresponding HARQ process ID for a given transmission occasion is based at least in part on the transmission occasion index for the given transmission occasion.

23. The apparatus of claim 19, wherein the instructions to monitor the one or more transmission occasions of the repetition window for reception of the grant-free downlink transmission are executable by the processor to cause the apparatus to:

identify, based at least in part on the resource configuration, a subset of transmission occasions within the repetition window during which the first repetition of the grant-free downlink transmission is allowed to be transmitted, wherein the repetition window comprises the subset of transmission occasions and at least one other transmission occasion; and monitor for the first repetition of the grant-free downlink transmission during at least one transmission occasion of the subset of transmission occasions.

24. The apparatus of claim 23, wherein a RV index of the first repetition of the grant-free downlink transmission is zero (0).

25. The apparatus of claim 23, wherein each potential RV index for each transmission occasion is based at least in part on the series of RV indices beginning at a respective transmission occasion of the subset of transmission occasions.

26. The apparatus of claim 23, wherein the instructions to decode the grant-free downlink transmission are executable by the processor to cause the apparatus to:

identify a hybrid automatic repeat request (HARQ) process identification (ID) for each transmission occasion of the repetition window, wherein the HARQ process ID for each transmission occasion is based at least in part on the series of RV indices beginning at a respective transmission occasion of the subset of transmission occasions; and combine logarithmic likelihood ratios (LLRs) of the grant-free downlink transmission for a given transmission occasion with a previously received signal based at least in part on the HARQ process ID.

27. The apparatus of claim 23, wherein the instructions are further executable by the processor to cause the apparatus to:

fail to decode the first repetition of the grant-free downlink transmission during an initial transmission occasion of the subset of transmission occasions; and decode the first repetition of the grant-free downlink transmission during an immediately subsequent transmission occasion of the subset of transmission occasions based at least in part on failing to decode the first repetition during the initial transmission occasion of the subset of transmission occasions.

28. The apparatus of claim 18, wherein the instructions to monitor the one or more transmission occasions of the repetition window for reception of the downlink transmission are executable by the processor to cause the apparatus to:

monitor for a first repetition of the downlink transmission in an initial transmission occasion of the repetition window, wherein the repetition window size is greater than one transmission occasion.

29. The apparatus of claim 28, wherein each RV index of the series of RV indices associated with a respective transmission occasion of the repetition window; and the instructions to decode the downlink transmission are executable by the processor to cause the apparatus to decode the downlink transmission during a given transmission occasion of the repetition window based at least in part on the RV index associated with the given transmission occasion.

30. An apparatus for wireless communication at a user equipment (UE), comprising:

means for receiving a resource configuration for reception of a downlink transmission within a repetition window, the resource configuration including an indicator of a repetition window size for the downlink transmission;

means for monitoring, in accordance with the resource configuration, one or more transmission occasions of the repetition window for reception of the downlink transmission;

means for identifying a series of redundancy version (RV) indices for the repetition window based at least in part on the resource configuration;

means for determining one or more potential RV indices for each transmission occasion of the repetition window, wherein each potential RV index for each transmission occasion is based at least in part on the series of RV indices beginning at any transmission occasion of the repetition window; and means for decoding the downlink transmission during the one or more transmission occasions of the repetition window based at least in part on the repetition window size and the one or more potential RV indices for each transmission occasion.

31. A non-transitory computer-readable medium storing code for wireless communication at a user equipment (UE), the code comprising instructions executable by a processor to:

receive a resource configuration for reception of a downlink transmission within a repetition window, the resource configuration including an indicator of a repetition window size for the downlink transmission;

monitor, in accordance with the resource configuration, one or more transmission occasions of the repetition window for reception of the downlink transmission;

identify a series of redundancy version (RV) indices for the repetition window based at least in part on the resource configuration;

determine one or more potential RV indices for each transmission occasion of the repetition window, wherein each potential RV index for each transmission occasion is based at least in part on the series of RV indices beginning at any transmission occasion of the repetition window; and decode the downlink transmission during the one or more transmission occasions of the repetition window based at least in part on the repetition window size and the one or more potential RV indices for each transmission occasion.

* * * * *